United States Patent
Uomori et al.

(10) Patent No.: US 7,237,919 B2
(45) Date of Patent: Jul. 3, 2007

(54) RANGE FINDER, THREE-DIMENSIONAL MEASURING METHOD AND LIGHT SOURCE APPARATUS

(75) Inventors: Kenya Uomori, Osaka (JP); Atsushi Morimura, Nara (JP); Joji Wada, Kanagawa (JP); Takeo Azuma, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 114 days.

(21) Appl. No.: 10/617,198

(22) Filed: Jul. 10, 2003

(65) Prior Publication Data

US 2004/0041997 A1     Mar. 4, 2004

Related U.S. Application Data

(62) Division of application No. 09/977,613, filed on Oct. 15, 2001, now Pat. No. 6,618,123.

(30) Foreign Application Priority Data

Oct. 20, 2000    (JP) ............................. 2000-320715

(51) Int. Cl.
    *G03B 15/02*    (2006.01)
    *F21S 9/00*    (2006.01)
(52) U.S. Cl. .................. 362/11; 362/233; 362/234; 356/3.12; 356/3.1; 356/4.01
(58) Field of Classification Search ............. 362/11, 362/233, 315, 276, 802, 234, 249, 251, 250; 315/151, 152, 158; 356/3.12, 3.1, 4.01
See application file for complete search history.

(56) References Cited

U.S. PATENT DOCUMENTS

| | | |
|---|---|---|
| 4,294,544 A | 10/1981 | Altschuler et al. |
| 4,427,880 A | 1/1984 | Kanade et al. |
| 4,594,001 A | 6/1986 | DiMatteo et al. |
| 4,687,325 A | 8/1987 | Corby, Jr. |
| 4,867,570 A | 9/1989 | Sorimachi et al. |

(Continued)

FOREIGN PATENT DOCUMENTS

JP          04-098106          3/1992

(Continued)

OTHER PUBLICATIONS

Inokuchi, Seiji; "Recent trend of Development and Application in Range Imaging"; MVA '98 IAPR Workshop on Machine Vision Applications; pp. 359-366; Nov. 17-19, 1998.

(Continued)

*Primary Examiner*—Jong-Suk (James) Lee
*Assistant Examiner*—Jacob Y. Choi
(74) *Attorney, Agent, or Firm*—Harness, Dickey & Pierce, P.L.C.

(57) ABSTRACT

The invention provides a range finder capable of carrying out three-dimensional measurement stably for a long period of time. A light pattern is projected on a subject by using a light source array unit in which a plurality of light sources, such as LEDs, are arranged. Even when each LED has a small light quantity, a sufficiently large quantity of light can be projected on the subject by the entire light source array unit, and hence, the three-dimensional measurement can be stably carried out. Also, a plurality of light patterns can be generated by electrically controlling a light emitting state of each LED of the light source array unit.

1 Claim, 20 Drawing Sheets

U.S. PATENT DOCUMENTS

| | | | |
|---|---|---|---|
| 4,871,256 A | | 10/1989 | Grindon |
| 4,893,223 A | * | 1/1990 | Arnold ................... 362/252 |
| 5,038,258 A | * | 8/1991 | Koch et al. ............... 362/237 |
| 5,101,326 A | * | 3/1992 | Roney ..................... 362/545 |
| 5,309,277 A | * | 5/1994 | Deck ...................... 359/387 |
| 5,369,492 A | * | 11/1994 | Sugawara ................. 356/394 |
| 5,580,163 A | * | 12/1996 | Johnson, II ............... 362/285 |
| 5,690,417 A | * | 11/1997 | Polidor et al. ............. 362/244 |
| 5,822,053 A | * | 10/1998 | Thrailkill ................ 356/237.1 |
| 5,828,449 A | * | 10/1998 | King et al. ............. 356/237.1 |
| 5,930,383 A | | 7/1999 | Netzer |
| 6,059,421 A | * | 5/2000 | White et al. ................ 362/97 |
| 6,070,986 A | * | 6/2000 | Yoneda .................... 362/33 |
| 6,191,541 B1 | * | 2/2001 | Patel et al. ................ 315/307 |
| 6,244,728 B1 | * | 6/2001 | Cote et al. ................ 362/249 |
| 6,357,893 B1 | * | 3/2002 | Belliveau ................. 362/285 |
| 6,392,744 B1 | | 5/2002 | Holec |
| 6,441,888 B1 | | 8/2002 | Azuma et al. |
| 6,450,663 B1 | * | 9/2002 | Reinbach .................. 362/249 |
| 6,598,994 B1 | * | 7/2003 | Tait et al. ................. 362/249 |
| 6,659,632 B2 | * | 12/2003 | Chen ...................... 362/545 |
| 6,850,637 B1 | * | 2/2005 | Burnett ................... 382/147 |
| 6,908,214 B2 | * | 6/2005 | Luk ....................... 362/250 |
| 6,948,825 B2 | * | 9/2005 | Christoph ................. 362/33 |

FOREIGN PATENT DOCUMENTS

| | | |
|---|---|---|
| JP | 04-241476 | 8/1992 |
| JP | 06-058755 | 3/1994 |
| JP | 06-137826 | 5/1994 |
| JP | 06-249648 | 9/1994 |
| JP | 07-239438 | 9/1995 |
| JP | 08-005348 | 1/1996 |
| JP | 08-136252 | 5/1996 |
| JP | 08178632 A | 7/1996 |
| JP | 09-203631 | 8/1997 |
| JP | 11-023225 | 1/1999 |
| JP | 11-094520 | 4/1999 |
| JP | 2000241131 A | 9/2000 |

OTHER PUBLICATIONS

Notice of Reasons of Rejection for Japanese Patent Application No. 2001-286646; Mailed: Aug. 31, 2004; and English translation.

* cited by examiner

Light pattern A

Light pattern B

Light pattern A

Light pattern B

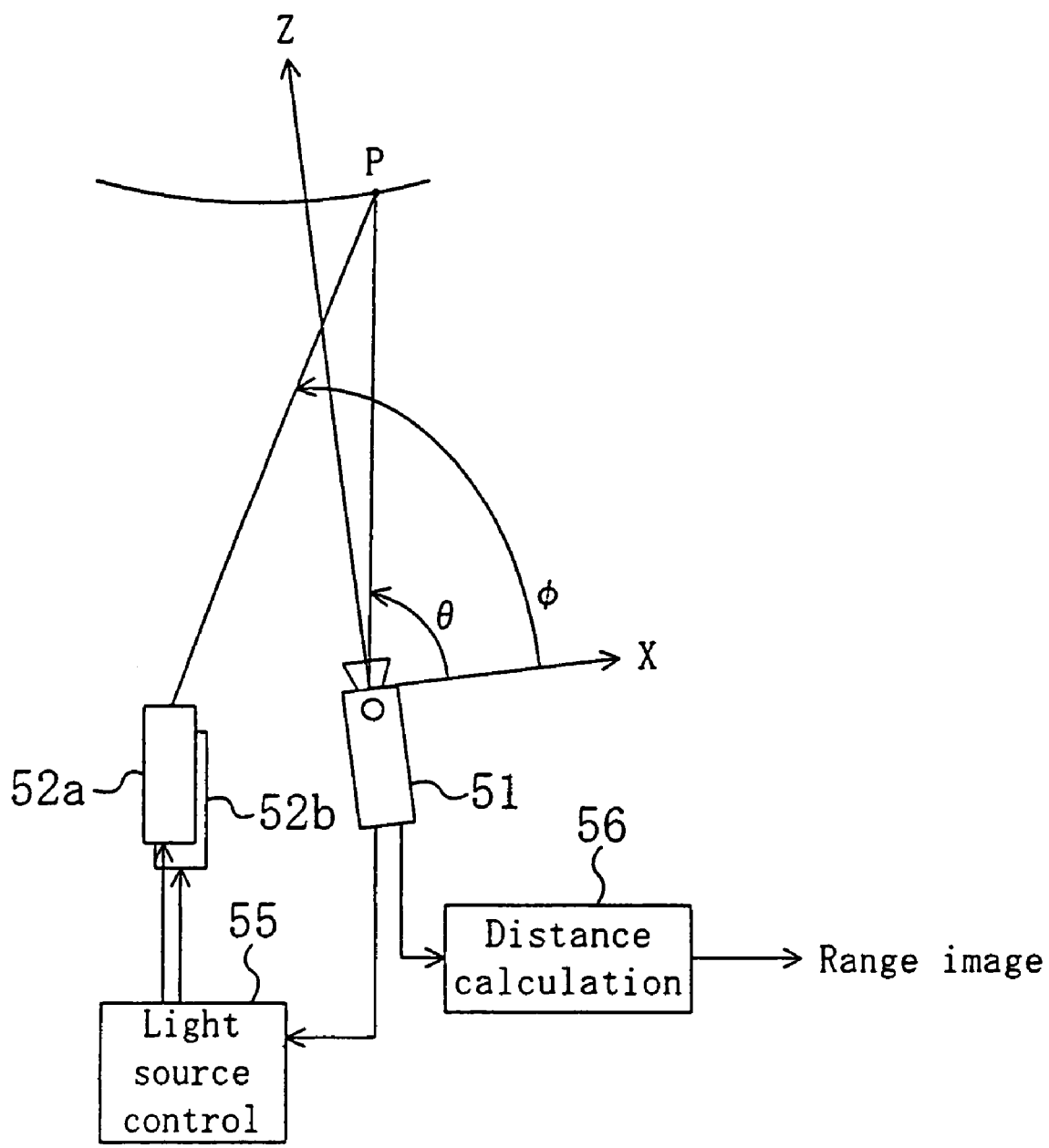

FIG. 22A
PRIOR ART
FIG. 22B
PRIOR ART
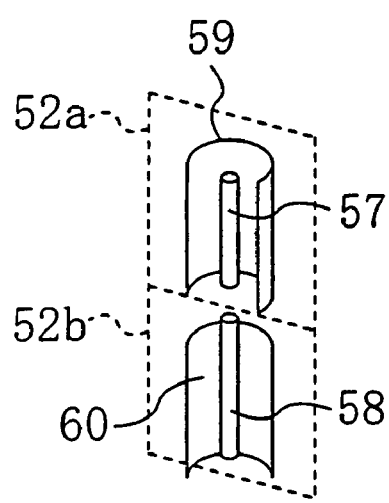
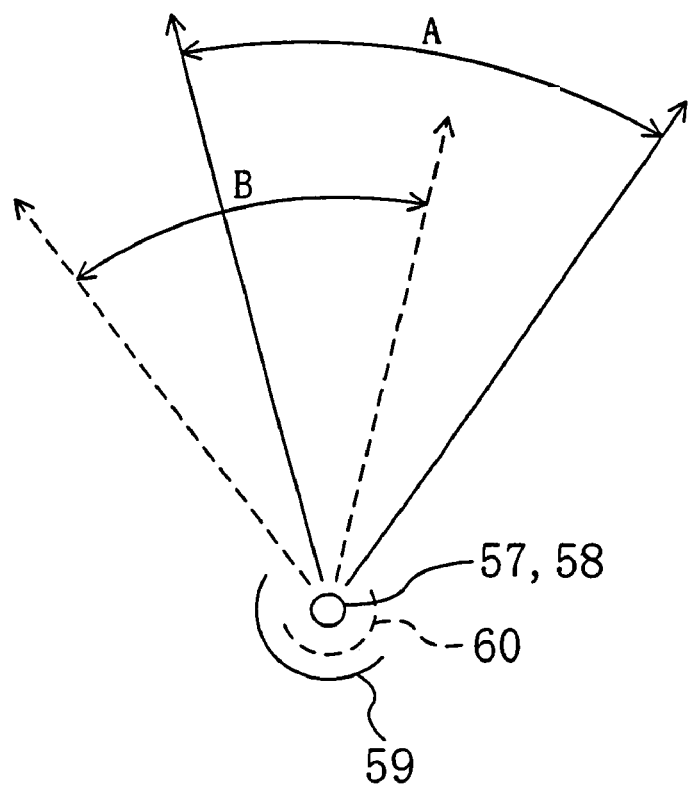

RANGE FINDER, THREE-DIMENSIONAL MEASURING METHOD AND LIGHT SOURCE APPARATUS

CROSS-REFERENCE TO RELATED APPLICATIONS

This application is a divisional of U.S. patent application Ser. No. 09/977,613 filed on Oct. 15, 2001 now U.S. Pat. No. 6,618,123. The disclosure(s) of the above application(s) is (are) incorporated herein by reference. This application claims the benefit of Japanese application serial number 2000-320715, filed Oct. 20, 2000.

BACKGROUND OF THE INVENTION

The present invention relates to a technique regarding a range finder capable of taking three-dimensional information of a subject (namely, a three-dimensional camera capable of measuring a range image).

FIG. 21 is a diagram for showing the structure of a conventional range finder. In FIG. 21, a reference numeral 51 denotes a camera, reference numerals 52a and 52b denote light sources, a reference numeral 55 denotes a light source control unit and a reference numeral 56 denotes a distance calculation unit. The light source control unit 55 makes the light sources 52a and 52b alternately emit light every field cycle in synchronization with a vertical synchronizing signal of the camera 51.

At this point, it is assumed that the optical center of the camera lies at the origin with the optical axis direction of the camera set as the Z-axis, the horizontal direction set as the X-axis and the vertical direction set as the Y-axis, that the direction of a viewing point from the light sources is at an angle $\phi$ against the X-axis, that the direction of the viewing point from the camera is at an angle $\theta$ against the X-axis, and that the light sources are positioned at (0, −D), namely, the base line length is D. The depth value Z of the viewing point P is calculated in accordance with the principle of triangulation calculation as follows:

$$Z = D\tan\theta\tan\phi/(\tan\theta - \tan\phi) \quad (1)$$

In order to obtain the angle $\phi$, predetermined light patterns are projected by the light sources 52a and 52b.

As the light sources 52a and 52b, for example, flash light sources 57 and 58 such as a xenon flash lamp are longitudinally disposed with reflector plates 57 and 58 disposed behind to be shifted in the lateral direction as shown in FIG. 22A. FIG. 22B is a plan view of the light sources of FIG. 22A. The light sources 52a and 52b radiate light in ranges A and B, respectively.

FIG. 23 is a diagram for showing light patterns radiated from the light sources 52a and 52b. In FIG. 23, the brightness obtained by projecting the light on a virtual screen Y is indicated along a direction of an arrow shown in the drawing. Specifically, the light projected from each of the light sources 52a and 52b has a characteristic that it is brightest on the center axis and is darker toward the periphery. Such a characteristic is exhibited because the reflector plates 59 and 60 each in the shape of a semi-cylinder are respectively disposed behind the flash light sources 57 and 58. Also, since the reflector plates 59 and 60 are shifted laterally in their directions, the projection ranges of the light sources 52a and 52b partially overlap each other.

FIG. 24 is a diagram for showing the relationship between the light projection angle $\phi$ in an H direction of FIG. 23 and the light intensity. The H direction accords with the direction of a crossing line between the virtual screen Y and one optional plane S among a plurality of planes each including the light source center and the lens center. In a region $\alpha$ of FIG. 24, one of the light patterns projected from the light sources 52a and 52b is bright relatively on the right hand side and the other is bright relatively on the left hand side, whereas the brightness of the light pattern is varied also along the height direction (Y-axis direction).

FIG. 25 is a graph for showing the relationship between the light intensity ratio between the two kinds of projected light in the region a of FIG. 24 and the light projection angle $\phi$. As shown in FIG. 25, the light intensity ratio and the angle $\phi$ are in a one-to-one corresponding relationship in the region $\alpha$.

In order to measure a distance, the two kinds of light patterns are alternately projected on a flat plane vertically provided so as to face the light sources at a predetermined distance and reflected light is taken by the camera 1, so that data of the relationship between the light intensity ratio and the light projection angle as shown in FIG. 25 can be previously obtained with respect to each Y-coordinate (corresponding to a Y-coordinate on the CCD). A data with respect to each Y-coordinate means a data with respect to each of the plural planes including the light source center and the lens center. Also, when the light sources 52a and 52b are disposed so that a line extending between the lens center of the camera 51 and the light sources 52a and 52b can be parallel to the X-axis of the CCD camera face, a distance can be accurately calculated by using the data of the relationship between the light intensity ratio and the light projection angle determined with respect to each Y-coordinate.

Assuming that a point P of FIG. 21 is the viewing point, the angle $\phi$ of the point P from the light source is measured by using the brightness ratio of the point P obtained images taken with the two kinds of light patterns projected and the relationship as shown in FIG. 25 corresponding to the Y-coordinate of the point P. Furthermore, the angle $\theta$ of the point P from the camera is determined on the basis of the position in the image (namely, the pixel coordinate values of the point P) and camera parameters (such as the focal length and the position of the optical center of the lens system). Then, the distance is calculated in accordance with the equation (1) based on these two angles $\phi$ and $\theta$ and the distance (base line length) D between the position of the light sources and the position of the optical center of the camera.

In this manner, when the light sources for generating the light patterns that are monotonically increased/decreased in accordance with the projection direction as in the region $\alpha$ of FIG. 24 are used, the three-dimensional measurement of a subject can be simply carried out.

However, in the conventional structure, the xenon flash lamp, which has a life of merely approximately 5000 stable emissions, is used as the light source. Therefore, when the range finder is used for a long period of time, maintenance such as exchange of the lamp should be frequently conducted. Also, the stability of the quantity of light emitted by the flash lamp is merely several %, and hence, higher measurement accuracy cannot be obtained.

Furthermore, a light source with a long life is, for example, an LED (light emitting diode), but the quantity of light emitted by one LED is small. Therefore, when the LED is singly used, the light quantity is so insufficient that the three-dimensional measurement cannot be stably carried out.

Moreover, since the projected light patterns are determined in accordance with the shapes of the reflector plates in the conventional structure, merely one set of light patterns can be generated in principle.

SUMMARY OF THE INVENTION

An object of the invention is providing a range finder usable for a long period of time and capable of executing stable three-dimensional measurement. Another object is easily generating optional light patterns in the range finder.

Specifically, the range finder of this invention for measuring a three-dimensional position of a subject by projecting light on the subject and receiving reflected light comprises a light source array unit in which a plurality of light sources are arranged; and a light source control unit for allowing at least two kinds of light patterns to be projected from the light source array unit by controlling a light emitting state of each of the plurality of light sources of the light source array unit.

According to this invention, since the light patterns are projected from the plural light sources included in the light source array unit, even when each light source has a small light quantity, a sufficiently large quantity of light can be projected on the subject as a whole, so that stable three-dimensional measurement can carried out. Also, since the light patterns are generated by controlling the light emitting states of the light sources of the light source array unit, an optional light pattern can be electrically generated without using a mechanical mechanism.

In the range finder, each of the plurality of light sources is preferably an LED. An LED has a characteristic that the light quantity is small but the life is comparatively long. Therefore, when the light source array unit is composed of the LEDs, a range finder usable for a long period of time can be realized.

Furthermore, the method of this invention for measuring a three-dimensional position of a subject based on reflected light images respectively obtained with at least two kinds of light patterns projected on the subject, comprises the steps of storing a parameter of an equation for approximating a space locus having a constant light intensity ratio between the two kinds of light patterns before three-dimensional measurement; obtaining a brightness ratio of a target pixel on the basis of reflected light images respectively obtained with the two kinds of light patterns projected; and carrying out the three-dimensional measurement by using the brightness ratio of the target pixel and the parameter of the space locus.

Alternatively, the method of this invention for measuring a three-dimensional position of a subject based on reflected light images respectively obtained with at least two kinds of light patterns projected on the subject, comprises the steps of storing a plurality of luminance ratio images in each of which a light intensity ratio between the two kinds of light patterns is expressed on a plane with a different fixed depth value before three-dimensional measurement; obtaining a brightness ratio of a target pixel based on reflected light images respectively obtained with the two kinds of light patterns projected; and carrying out the three-dimensional measurement by comparing the brightness ratio of the target pixel with a light intensity ratio in the vicinity of coordinates of the target pixel on each of the luminance ratio images.

Alternatively, the method of this invention for measuring a three-dimensional position of a subjected based on reflected light images respectively obtained with at least two kinds of light patterns projected on the subject, comprises the steps of storing a plurality of luminance ratio images in each of which a light intensity ratio between the two kinds of light patterns is expressed on a plane with a different fixed depth value before three-dimensional measurement; setting representative points on each of the luminance ratio images and determining a parameter of a relational expression between a light intensity ratio and a depth value of each of the representative points on the basis of the plurality of luminance ratio images and the different depth values respectively corresponding to the luminance ratio images; obtaining a light intensity ratio of a target pixel based on reflected light images respectively obtained with the two kinds of light patterns projected; and carrying out the three-dimensional measurement by using coordinate values of the target pixel, the light intensity ratio of the target pixel and the parameter of the relational expression between the light intensity ratio and the depth value of each of the representative points.

Moreover, the range finder of this invention for measuring a three-dimensional position of a subject by projecting light on the subject and receiving reflected light comprises a projection unit for projecting at least two kinds of light patterns; and a projected light pattern control unit for making a measurement range or measurement accuracy variable by changing a set of light patterns to be projected from the projection unit.

In this range finder, the measurement range or measurement accuracy can be controlled by changing a set of light patterns to be projected from the projection unit. As a result, a variety of measurement modes can be realized.

The light source apparatus of this invention comprises a plurality of light sources arranged therein, which is capable of projecting a desired light pattern by controlling a light emitting state of each of the plurality of light sources, and the plurality of light sources are arranged on a flat surface with optical axes thereof radially disposed.

Alternatively, the light source apparatus of this invention comprising a plurality of light sources arranged therein, which is capable of projecting a desired light pattern by controlling a light emitting state of each of the plurality of light sources, and a projection range is divided into a plurality of ranges in a direction for forming the light pattern, and groups of light sources respectively covering the plurality of divided ranges are aligned in a direction perpendicular to the direction for forming the light pattern.

BRIEF DESCRIPTION OF THE DRAWINGS

FIG. 2A is a cross-sectional view thereof and FIGS. 2B and 2C are plan views thereof;

FIG. 18A shows the control where the size of the measurement range is changed and FIG. 18B shows the control where the position of the measurement range is changed;

FIG. 21 is a diagram for showing the structure of a conventional range finder;

FIGS. 22A and 22B are diagrams for showing an example of the structure of light sources of FIG. 21;

DETAILED DESCRIPTION OF THE INVENTION

Preferred embodiments of the invention will now be described with reference to the accompanying drawings.

Embodiment 1

Figure 1:
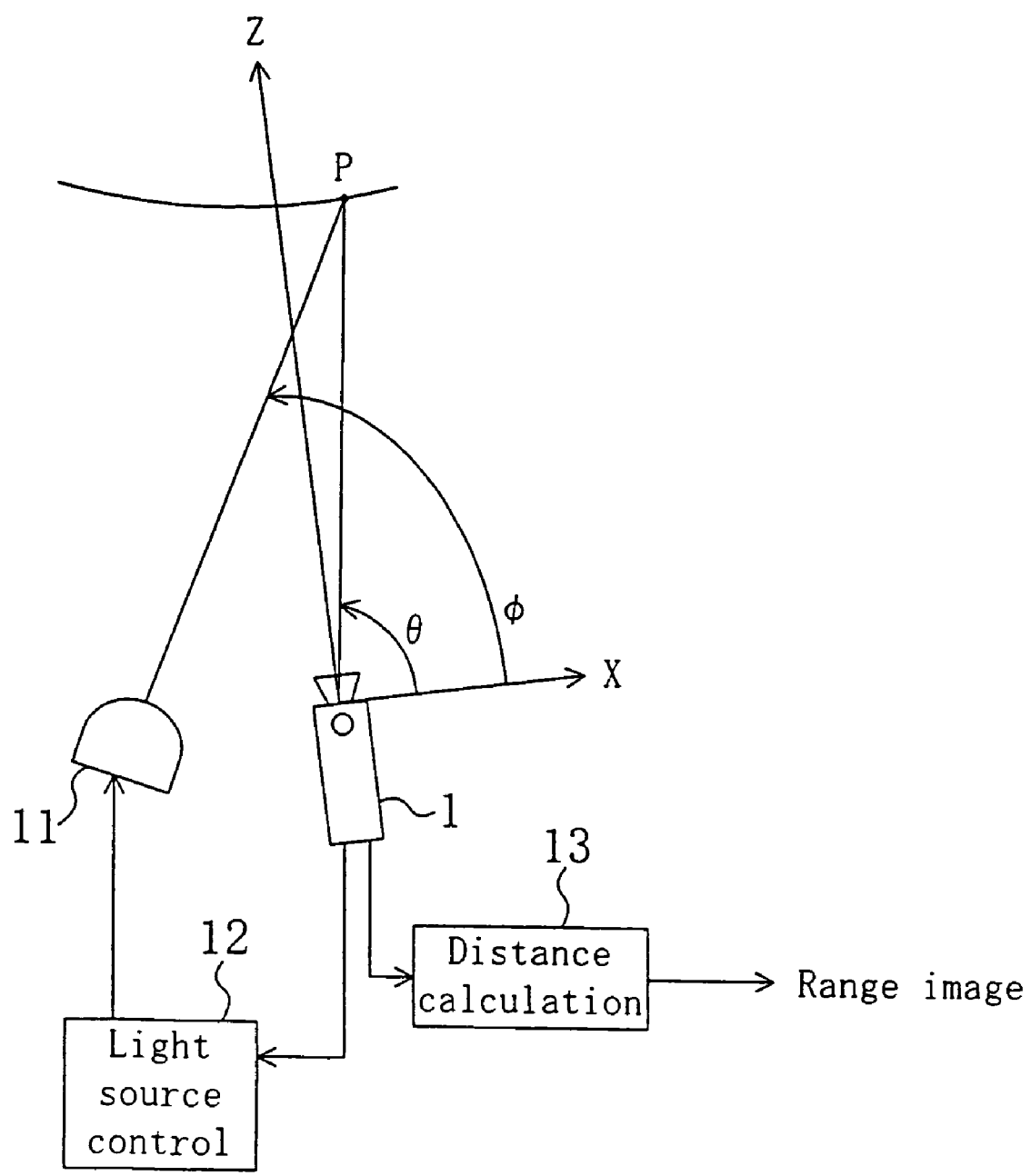
FIG. 1 is a block diagram for showing the structure of a range finder according to Embodiment 1 of the invention.

FIG. 1 is a diagram for showing the structure of a range finder according to Embodiment 1 of the invention. In FIG. 1, a reference numeral 1 denotes a camera, a reference numeral 11 denotes a light source array unit in which a plurality of light sources are arranged, a reference numeral 12 denotes a light source control unit for controlling light emitting states of the respective light sources of the light source array unit 11, and a reference numeral 13 denotes a distance calculation unit, that is, a three-dimensional measurement unit, for carrying out three-dimensional measurement based on reflected light images taken with the camera 1.

Figure 23:
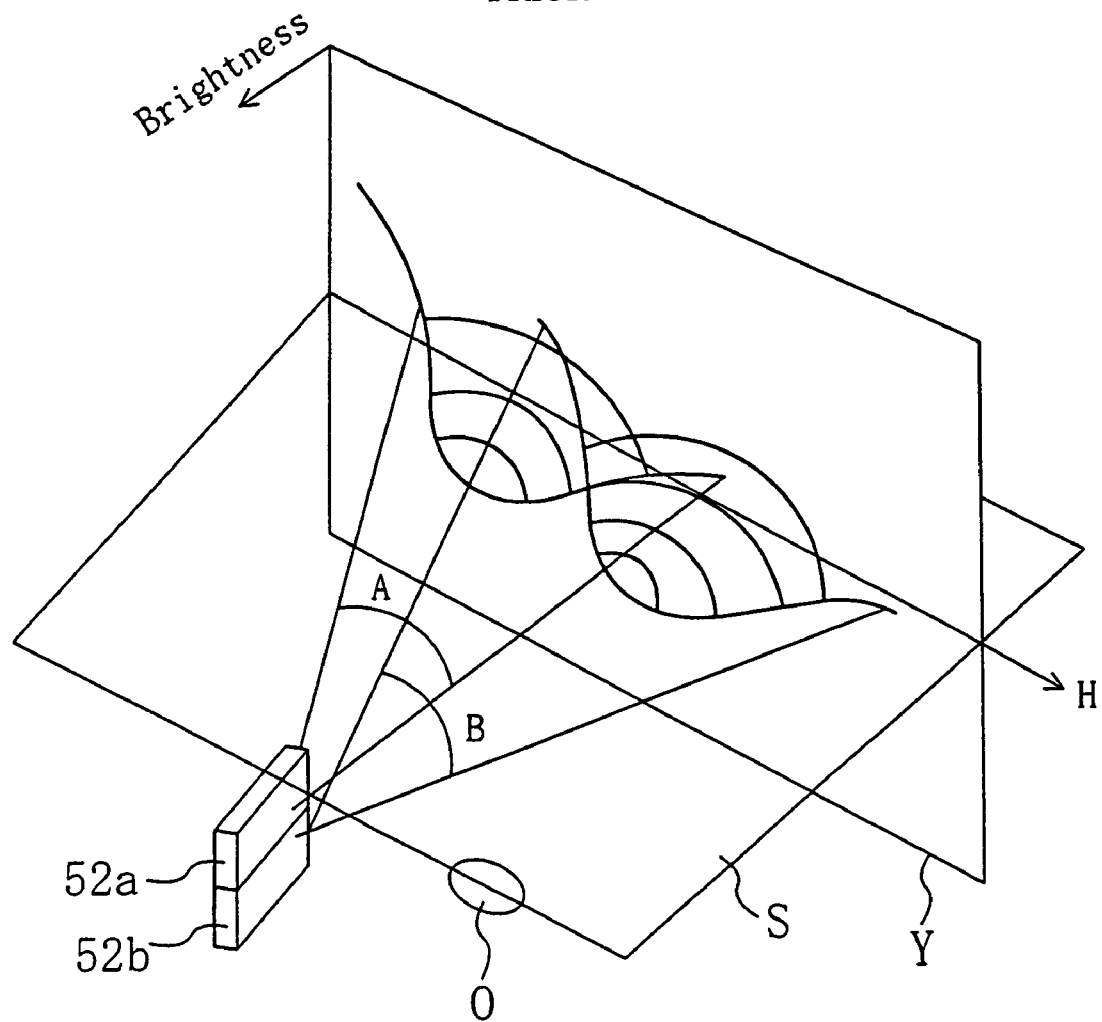
FIG. 23 is a diagram for showing a distribution of projected light obtained by the structure of FIG. 21.

In the structure of FIG. 1, two kinds of light patterns as those shown in FIG. 23 are projected from the light source array unit 11 on a subject and reflected light from the subject is taken by using the camera 1, so as to measure the three-dimensional position of the subject.

Figure 2A:
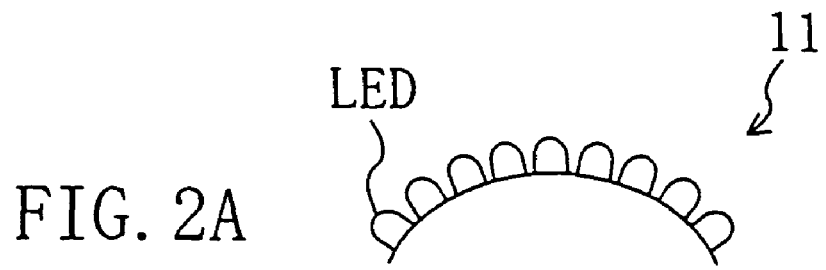
FIGS. 2A, 2B and 2C are diagrams for showing examples of the structure of a light source array unit, and specifically.
Figure 2B:
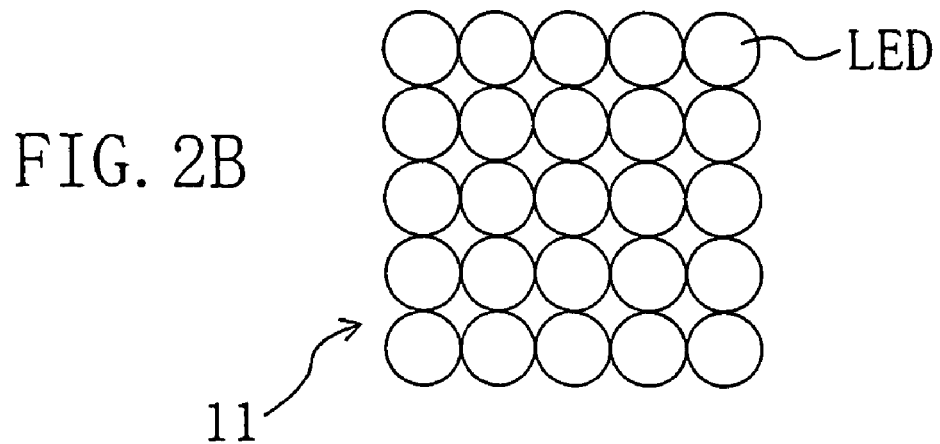
Figure 2C:
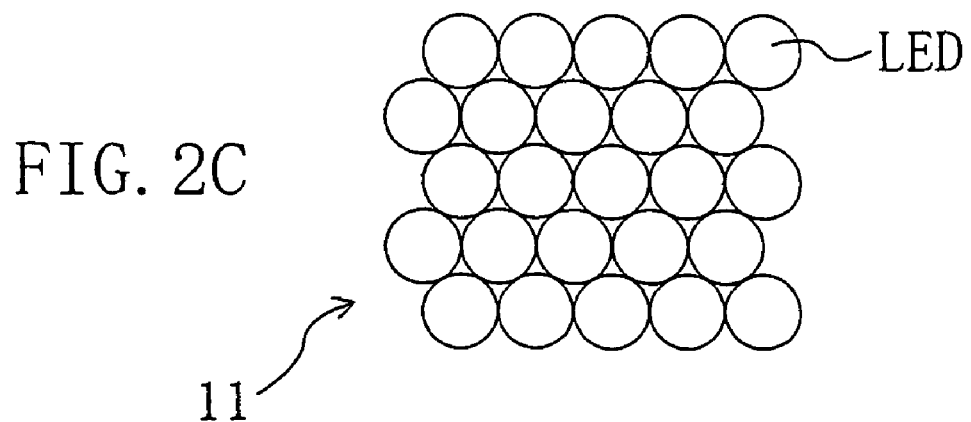

FIGS. 2A through 2C are diagrams for showing examples of the structure of the light source array unit 11, and specifically FIG. 2A is a cross-sectional view thereof and FIGS. 2B and 2C are plan views thereof. The light source array unit 11 of FIGS. 2A through 2C uses an infrared LED (light emitting diode) as a light source. As shown in FIG. 2A, a plurality of LEDs are arranged on a curved surface of a cylindrical surface or a spherical surface. This is because a single LED has a radiation range (radiation angle) of merely approximately 20 degrees and hence cannot project light over a large range, and hence, the optical axes of the respective LEDs are thus radially disposed.

Furthermore, in the plane structure, the LEDs may be arranged in a lattice pattern as shown in FIG. 2B or in a checkered (zigzag) pattern as shown in FIG. 2C. In the arrangement of FIG. 2C, the number of LEDs disposed in each unit area is larger and hence the light quantity per unit area can be larger than in the arrangement of FIG. 2B, and therefore, the size of the light source array unit 11 can be smaller. Alternatively, the light sources may be concentrically arranged.

Figure 3A:
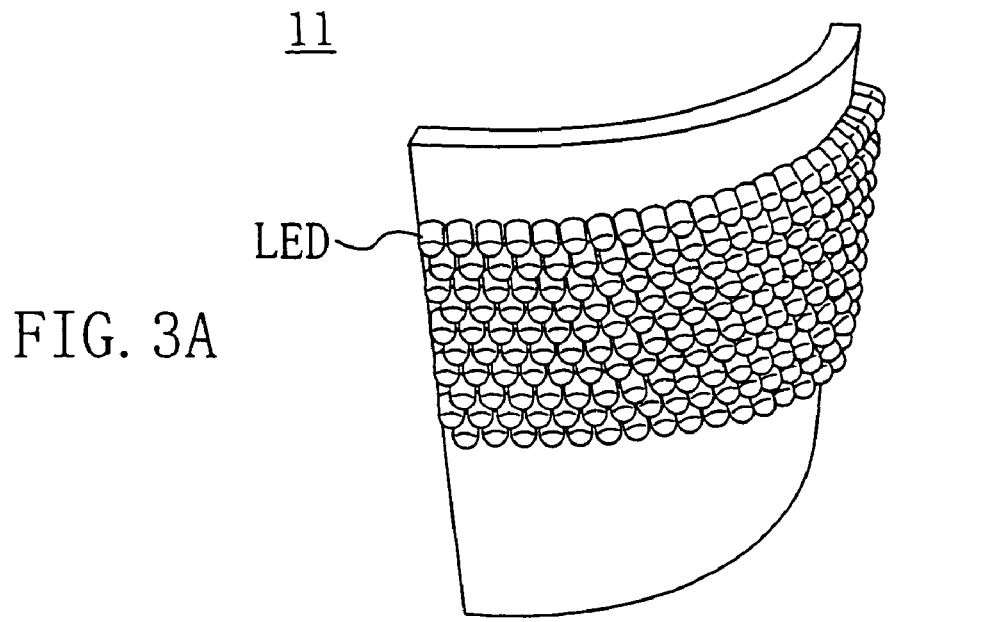
FIGS. 3A, 3B and 3C are diagrams for showing examples of the appearance of the light source array unit.

FIG. 3A is a perspective view for showing the appearance of an example of the light source array unit 11 fabricated by the present inventors on an experimental basis. In the light source array unit of FIG. 3A, approximately 200 LEDs are arranged in a checkered pattern on a curved surface of a cylinder.

Figure 3B:
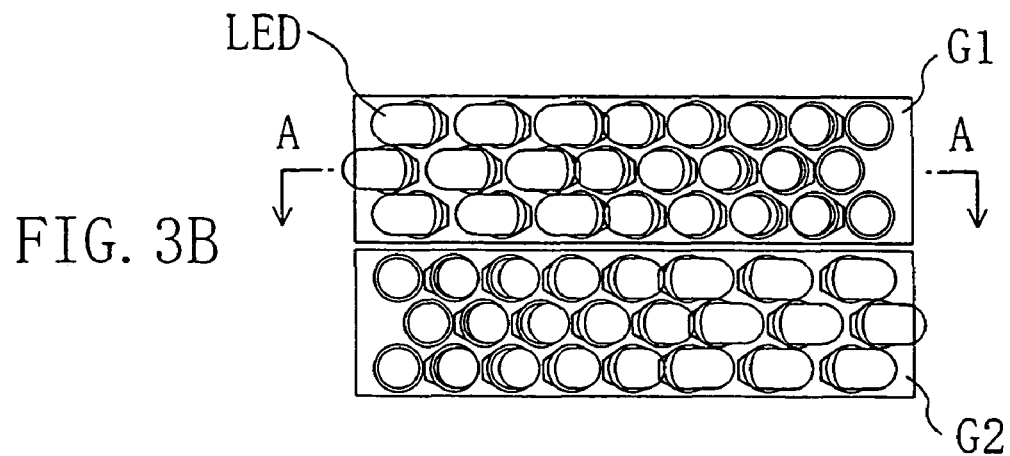
Figure 3C:
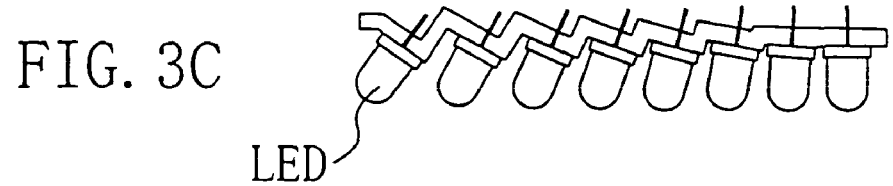

FIG. 3B is a diagram for showing the appearance of another example of the light source array unit 11 fabricated as a light source apparatus by the present inventors on an experimental basis, and FIG. 3C is a cross-sectional view of FIG. 3B. In the structure of FIG. 3C, the LEDs are arranged on flat surfaces with their optical axes radially disposed. When the LEDs are thus provided on a substantially flat face, the depth of the light source array unit 11 can be reduced.

Also, in the structure of FIG. 3A, the LEDs are aligned in a direction for forming light patterns (in the lateral direction in FIG. 3A). In contrast, in the structure of FIG. 3B, the range for projecting the light patterns is divided into two ranges, that is, a right range and a left range, so that the LEDs aligned on each horizontal line can cover either of the divided ranges. In other words, groups of light sources (groups G1 and G2 in FIG. 3B) each covering each divided range are aligned in a direction perpendicular to the direction for forming the light patterns (in the vertical direction in FIG. 3B). When this structure is employed, the lateral size of the light source array unit 11 can be substantially halved, so as to attain a structure closer to that of a point light source than the structure of FIG. 3A.

Although each group G1 or G2 of the LEDs includes three lines of LEDs so as to change the radiation directions of the LEDs every three lines in FIG. 3B, the radiation directions may be changed every line or every plural lines other than three lines.

Figure 15A:
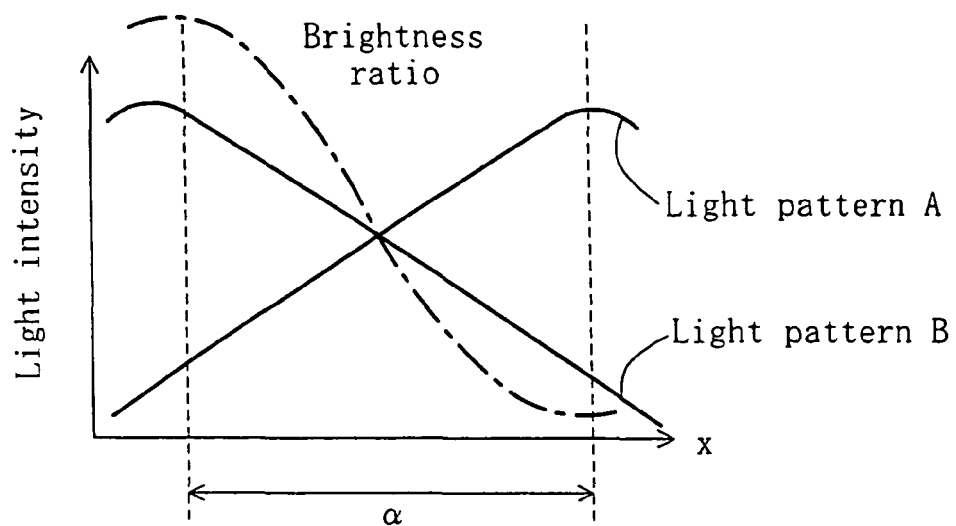
FIGS. 15A, 15B and 15C are diagrams for explaining modification of the quantity of light emitted by the light source array.

Furthermore, although the light pattern projection range is divided into the two ranges in FIG. 3B, the projection range may be divided into three or more ranges, so as to align groups of light sources covering the respective ranges in the vertical direction. In this case, when the number of dividing the projection range is increased, the lateral size of the light source array unit 11 can be further reduced, whereas the longitudinal size is reversely increased, and hence, the light intensity distribution as shown in FIG. 15A may be varied in the vertical direction of an image. If the degree of this variation falls within a range in which the light intensity patterns can be accurately approximated through calculation algorithm described below, such a light source array unit can be practically used as the light source apparatus.

Figure 4A:
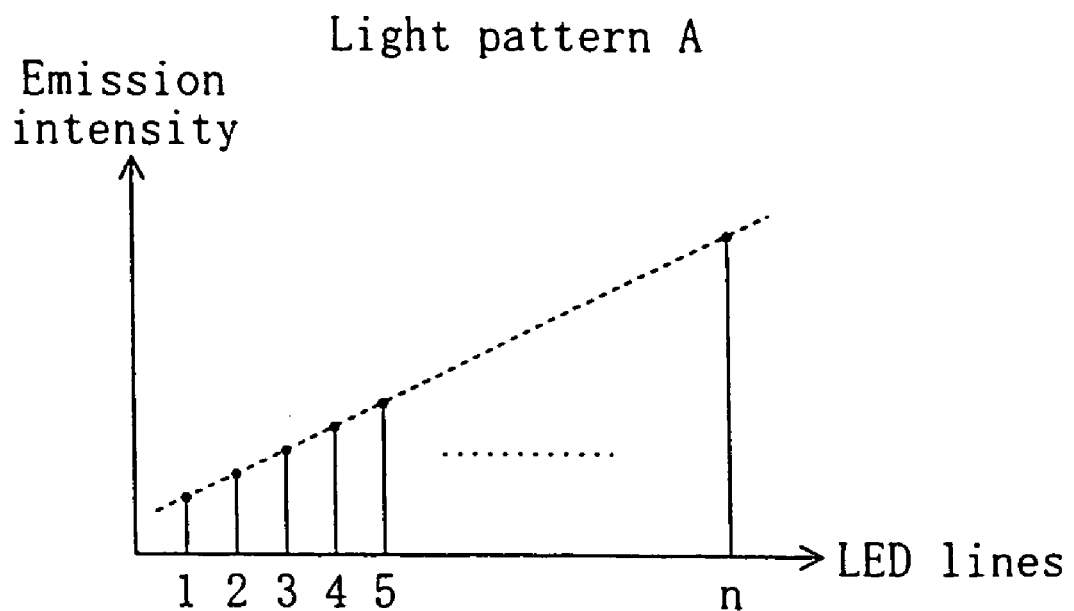
FIGS. 4A and 4B are diagrams for showing two kinds of light patterns generated by controlling the emission intensity of a light source.
Figure 4B:
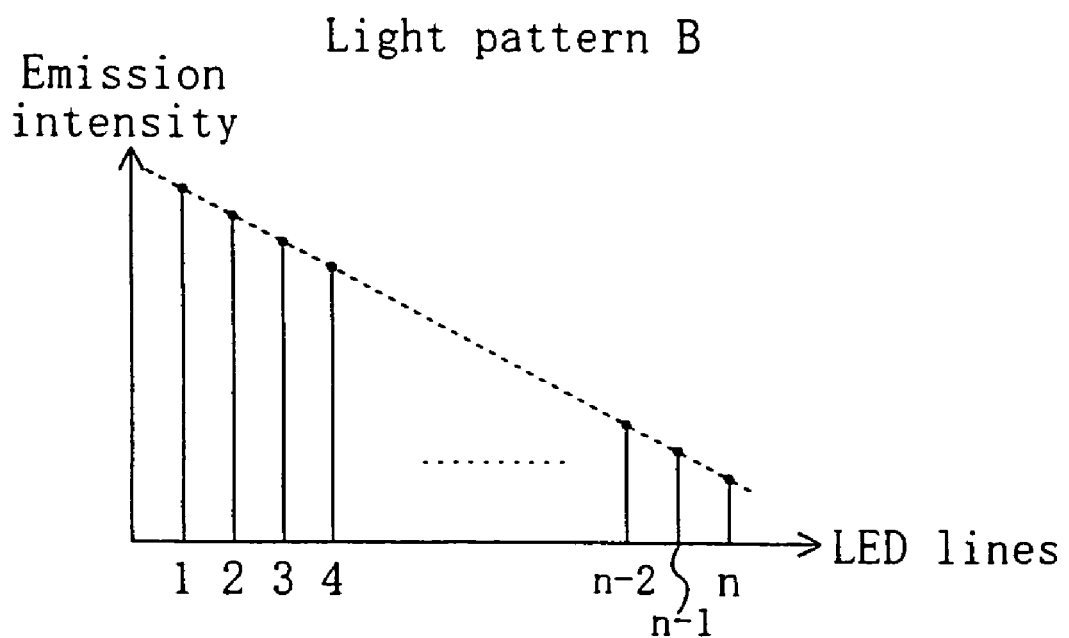

FIGS. 4A and 4B are diagrams of two kinds of light patterns generated by using the light source array unit 11. The light source control unit 12 generates the light patterns by controlling the emission intensities (brightness) of the LEDs of the light source array unit 11 in accordance with the positions of the LEDs. Herein, the emission intensity is controlled by adjusting a voltage applied to each LED serving as the light source (namely, a current flowing the LED). In the light pattern A shown in FIG. 4A, the light quantities of the LEDs are monotonically increased in accordance with line numbers of the LEDs, and in the light pattern B shown in FIG. 4B, the light quantities of the LEDs are monotonically decreased in accordance with the line numbers of the LEDs.

Figure 5:
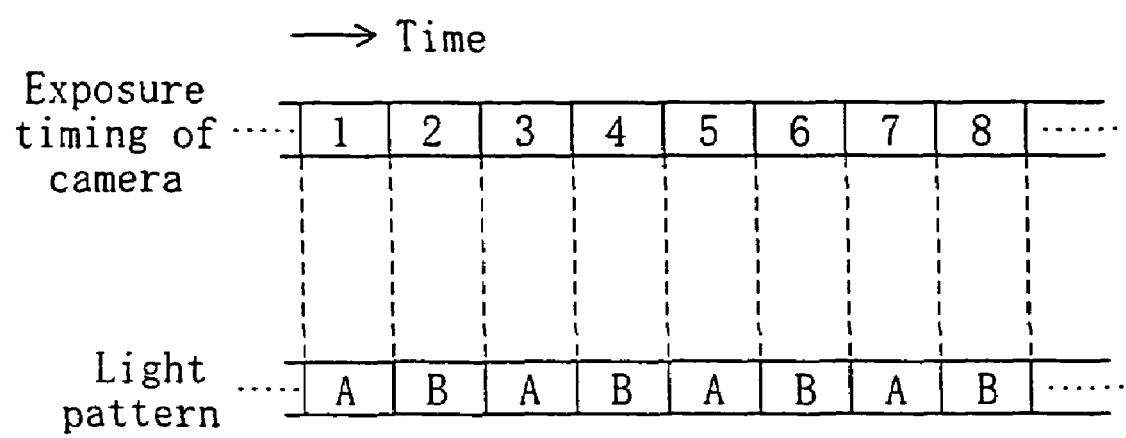
FIG. 5 is a diagram for showing switching timing between the light patterns.
Figure 24:
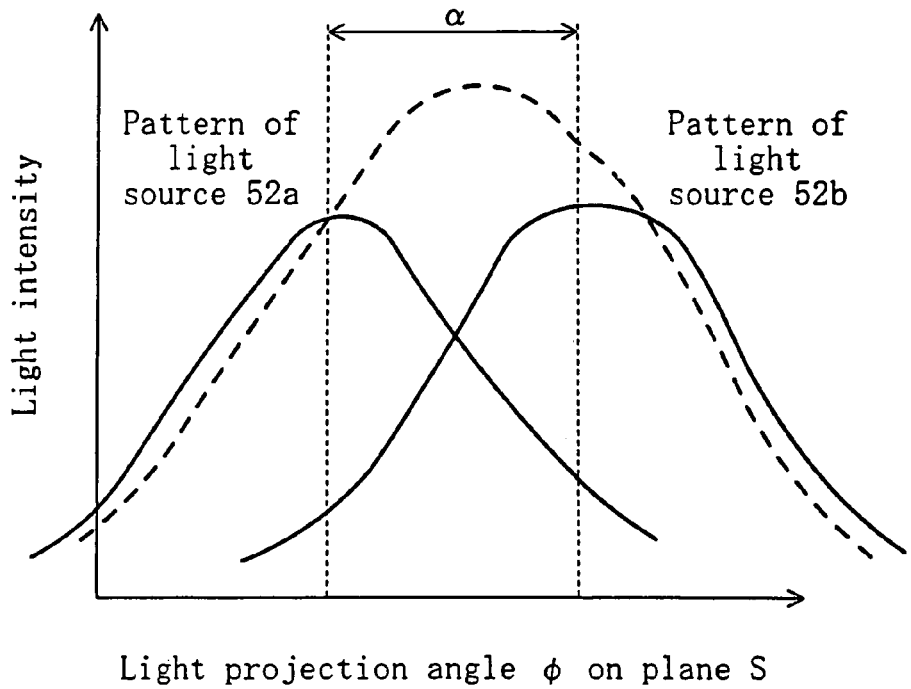
FIG. 24 is a graph for showing light patterns and a measurement range obtained by the structure of FIG. 21.
Figure 25:
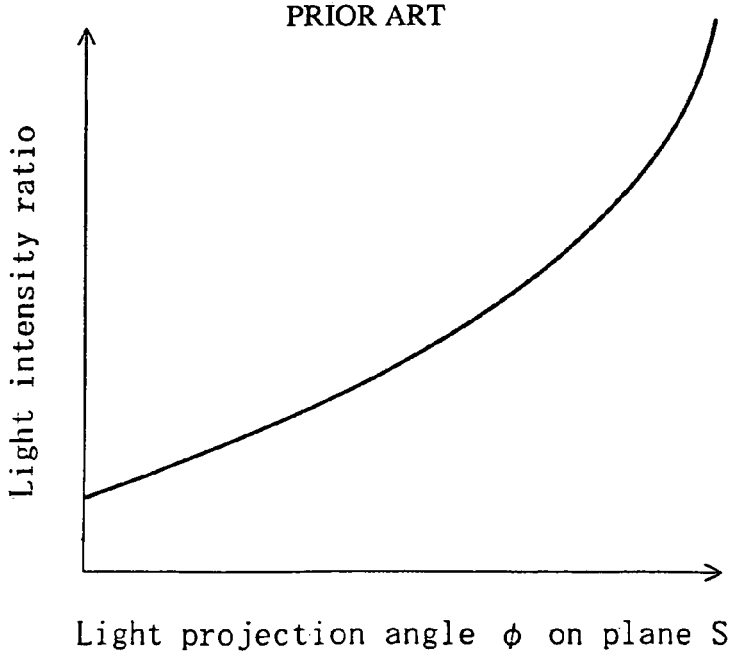
FIG. 25 is a diagram for showing the relationship between a light projection angle and a light intensity ratio obtained based on the graph of FIG. 24.

The light source control unit 12 allows the light pattern A and the light pattern B of FIGS. 4A and 4B to be alternately projected in accordance with exposure timing (exposure cycle) of the camera 1 as shown in FIG. 5. As a result, a reflected light image through projection of the light pattern A and a reflected light image through projection of the light pattern B are alternately obtained from the camera 1. In other words, light patterns similar to those in the region α of FIG. 24 are projected on the subject, and images of the subject with the respective light patterns projected are alternately obtained.

Although the two kinds of light patterns A and B are herein continuously and alternately projected for taking an image sequence, in the case where a still image is taken, two images are taken with the camera 1 with the light patterns A and B respectively projected.

Also, the brightness of the LEDs themselves are controlled for controlling the light quantities of the LEDs in the above description, the light patterns may be generated instead by controlling the emission times of the respective LEDs in accordance with the positions of the LEDs by the light source control unit 12. In this case, with a current flowing through each LED kept constant, merely the emission times of the respective LEDs are controlled within the exposure time of the camera.

Figure 6A:
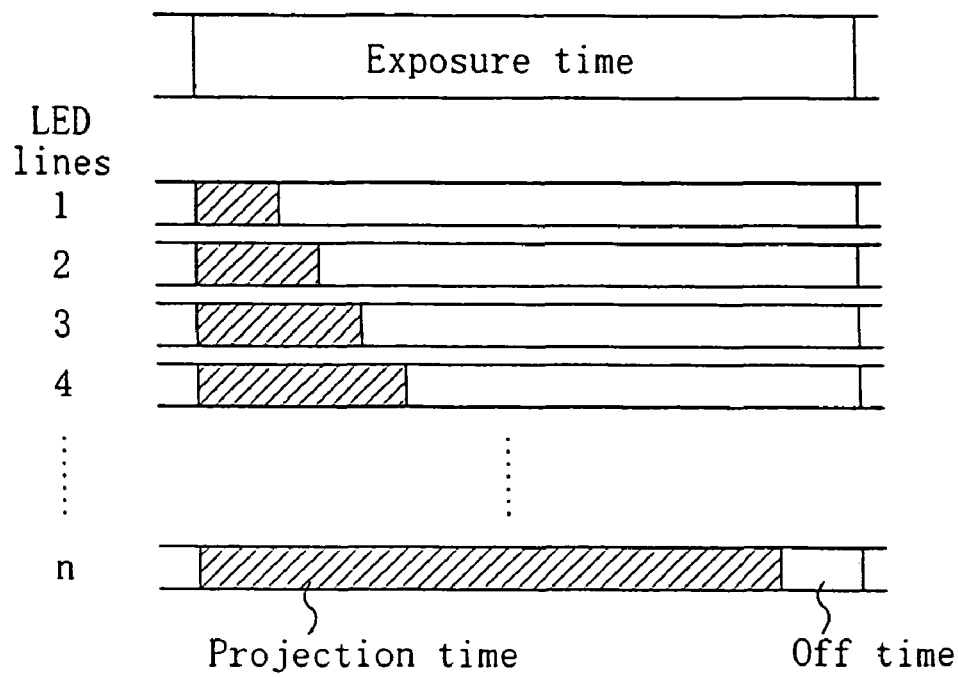
FIGS. 6A and 6B are diagrams for showing two kinds of light patterns generated by controlling the emission time of a light source.
Figure 6B:
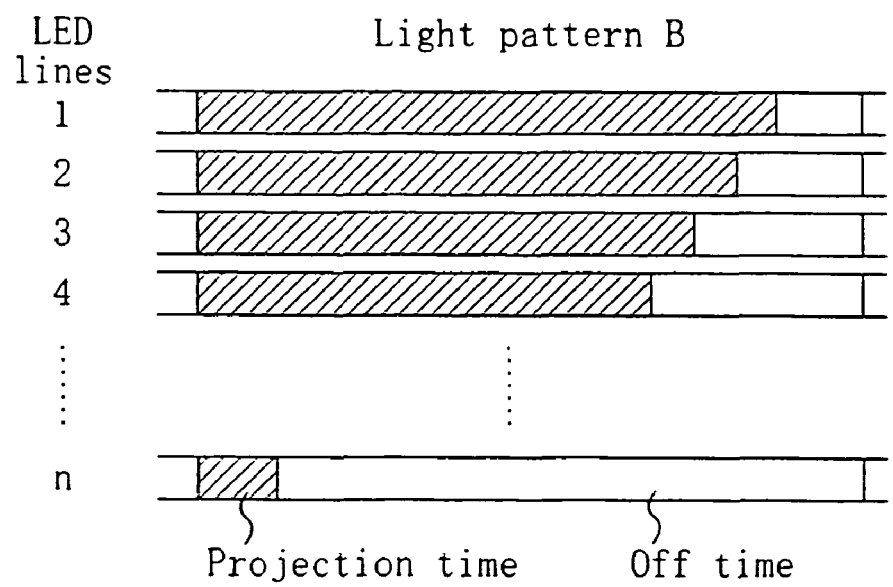

FIGS. 6A and 6B are diagrams of the two kinds of light patterns generated by controlling the emission times. In the light pattern A shown in FIG. 6A, the emission times of the LEDs are monotonically increased in accordance with the line numbers of the LEDs, and in the light pattern B shown in FIG. 6B, the emission times of the LEDs are monotonically decreased in accordance with the line numbers of the LEDs. Within the exposure time of the camera 1, the total light quantity is increased as the LED emits light for a longer time, so that such light patterns can be generated.

In the case where an LED itself generates heat or in the case where a current flowing through an LED is changed with time owing to a temperature characteristic of an LED driving circuit, the brightness of the LED is varied. In this case, an error may be caused in the generated light pattern when the emission intensity is controlled. However, when the light quantities are controlled by changing the emission times with the current flowing through each LED kept constant, the LED driving circuit can be stabilized and the heat generated by the LEDs themselves can be suppressed, and hence, the light patterns themselves are minimally varied. Accordingly, the three-dimensional measurement using a light intensity ratio of reflected light is minimally affected by the LED driving circuit and the heat generated by the LEDs. Furthermore, since the emission times are changed with the emission intensity kept constant, the light quantity ratio can be accurately set even when the performances of the respective LEDs are varied. Moreover, in the case where the light intensity is controlled by using a current flowing through the LED, the light intensity should be controlled by an analog circuit, but the emission time can be easily controlled by a digital circuit. Therefore, the accuracy in the emission control can be easily improved. In other words, when the light quantities of the respective LEDs are controlled by adjusting the emission times, highly accurate and stable light patterns can be generated.

(Three-Dimensional Measurement)

Next, a method for carrying out the three-dimensional measurement on the basis of the obtained reflected light images will be described. This corresponds to processing executed by the distance calculation unit 13 of FIG. 1.

The calculation described with reference to the prior art can be also employed in this embodiment, but in the conventional three-dimensional calculation, it is premised that the light source is a point light source. Therefore, in the case where the LED array is used as the light source as in this embodiment, there is a possibility of an error caused owing to the size of the light source itself when the conventional method is directly employed. Accordingly, a method for accurately carrying out the three-dimensional measurement without causing an error even when the light source has its own size will now be described in detail.

Figure 7:
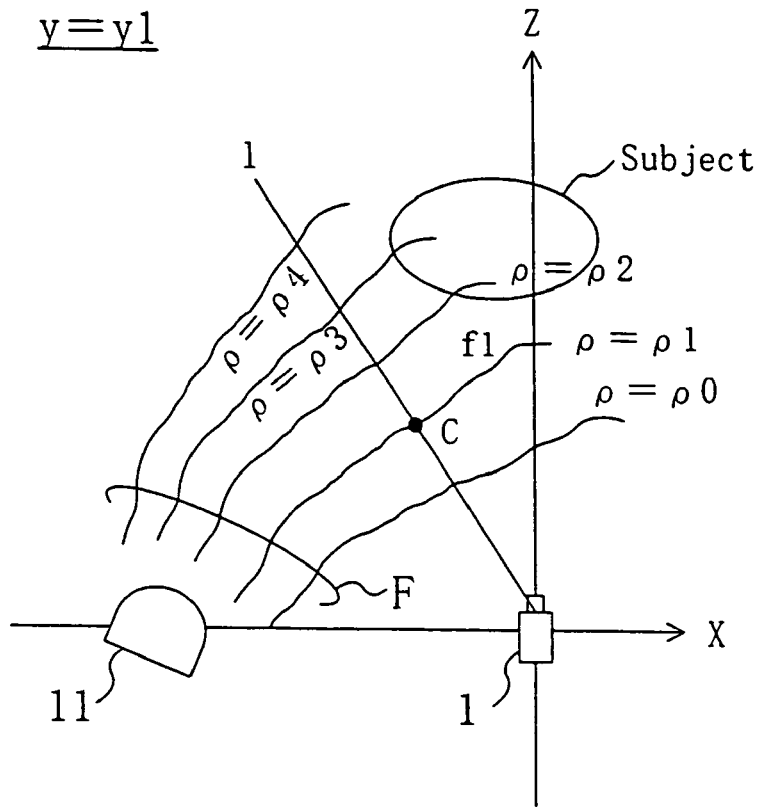
FIG. 7 is a diagram for explaining three-dimensional measurement according to an embodiment of the invention in which the positional relationship among the light source array unit, a camera and a subject on a plane with a fixed y-coordinate of the camera is shown.

FIG. 7 is a diagram for showing the positional relationship among the light source array unit 11, the camera 1 and the subject on a plane with a fixed y-coordinate (y1) of the camera. As shown in FIG. 7, portions where a brightness ratio ρ (light intensity ratio) obtained from the images respectively taken with the light patterns A and B projected is constant (namely, ρ=ρ0, ρ1, ρ2, ρ3 or ρ4) can be represented by a curve group F. Therefore, an equation, f(ρ, x, z)=0, for approximating these curves is previously obtained before using the range finder.

The equation f is obtained as follows: In FIG. 7, planes with a fixed Z-coordinate (planes disposed as frontal parallel planes) are disposed in front of the camera 1 in positions at various depths (Z=z0, z1, etc.), and the light patterns A and B are projected from the light source array unit 11 so as to take images by using the camera 1.

Figure 8:
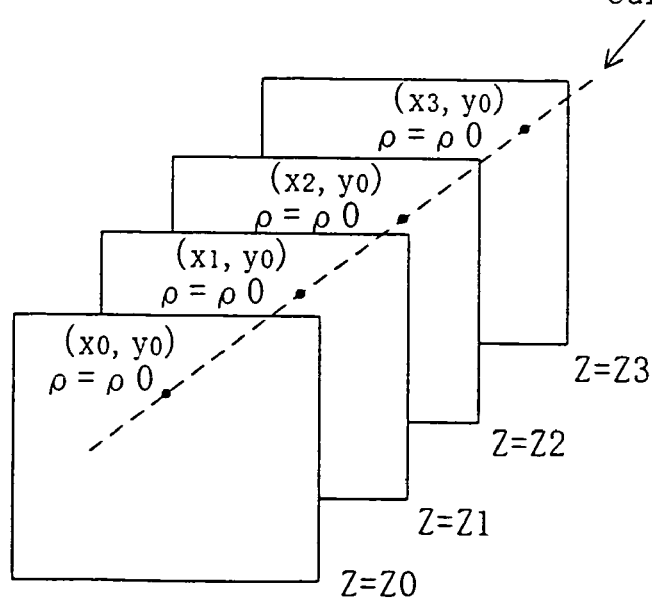
FIG. 8 is a diagram for showing a curve approximating a space locus having a constant light intensity ratio.

Next, as shown in FIG. 8, a brightness ratio of each pixel between the images respectively corresponding to the light patterns A and B is obtained, and in the same y-coordinate, y0, a curve linking points having the same brightness ratio ρ (corresponding to a broken line of FIG. 8) is allocated to a regression curve. Instead, linear polygonal line approximation may be employed instead of allocation to the regression curve. Thus, an equation of the regression curve by using the brightness ratio ρ as a parameter is obtained with respect to each y-coordinate of the images. Specifically, a parameter of an equation for approximating a space locus having a constant light intensity ratio ρ is previously stored as the preparation for the three-dimensional measurement.

Next, the three-dimensional measurement is actually carried out on the basis of the taken image data.

It is herein assumed that a target pixel has coordinates (x1, y1). In the coordinates (x1, y1), a luminance ratio in images taken respectively with the light patterns A and B projected is calculated. When the luminance ratio is assumed to be ρ1, an equal luminance ratio curve satisfying ρ=ρ1 (corresponding to a curve f1 of FIG. 7) is selected on a plane where y=y1. At this point, an intersection C between the selected curve f0 and a straight line 1 drawn through a target point on the CCD (x1, y1) and the lens center of the camera corresponds to the three-dimensional position to be obtained.

In this manner, the brightness ratio is obtained from the two images with respect to each pixel, and with respect to a target pixel, a corresponding equal luminance ratio curve is determined on the basis of the luminance ratio. Then, an intersection between the equal luminance ratio curve and the straight line 1 is obtained, and thus, the three-dimensional measurement of each pixel of the taken images can be carried out.

Furthermore, when the term of y is involved in the approximation equation f of the equal luminance ratio curve, namely, when an equation, f (ρ, x, y, z)=0 is used, so as to be three-dimensionally allocated to the regression curve, the curve f to be used in the three-dimensional calculation can be directly determined on the basis of the luminance ratio ρ. In this case, there may be no intersection between the line 1 of FIG. 7 and the curve f, but in such a case, an average value of points where the distance between the line 1 and the curve f is minimum or an intersection obtained through projection on a ZX plane may be obtained as the intersection.

Figure 9:
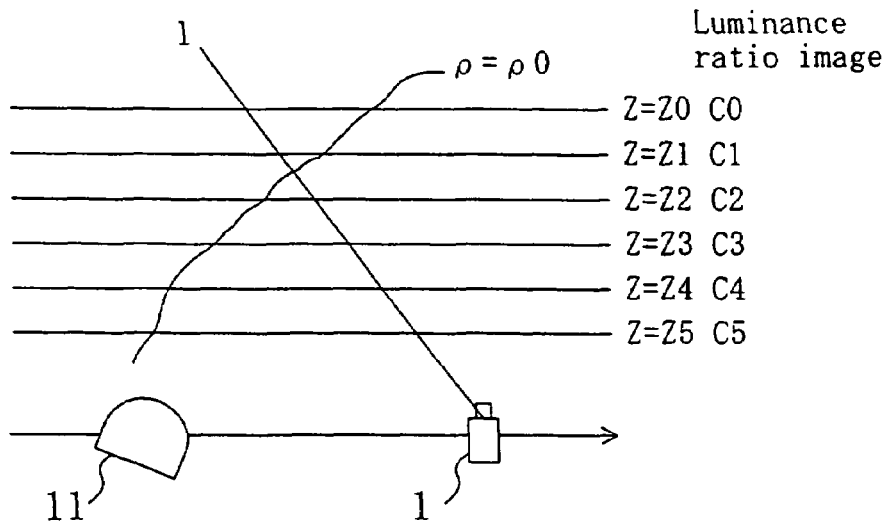
FIG. 9 is a diagram for explaining the three-dimensional measurement according to the embodiment of the invention in which luminance ratio images previously prepared are shown.

Another method for carrying out the three-dimensional measurement is as follows:

As shown in FIG. 9, a plane with a fixed Z value (depth value) (Z0) is disposed in front of the camera 1, and the light patterns A and B are projected on the plane so as to take the images by using the camera 1. Then, a brightness ratio of each pixel is obtained and an image representing the luminance ratio is previously stored as a luminance ratio image C0. Similarly, with respect to different depth values Z1 through Z5, luminance ratio images C1 through C5 are respectively stored.

Next, the three-dimensional measurement is actually carried out from the taken image data.

Figure 10:
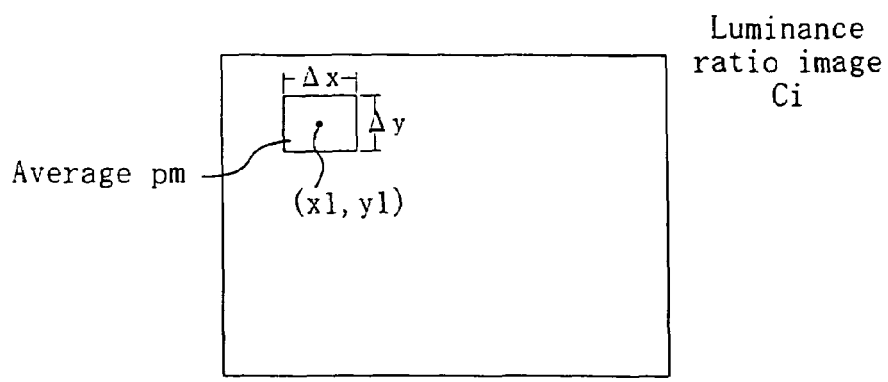
FIG. 10 is a diagram for showing calculation of an average luminance ratio in the vicinity of a target pixel in the luminance ratio image.

It is herein assumed that a target pixel has coordinates (x1, y1). In the coordinates (x1, y1), the luminance ratio between the images respectively obtained with the light patterns A and B projected is assumed to be ρ0. At this point, in a previously obtained luminance ratio image Ci (i=0 through 5), an average luminance ratio ρm is obtained in a range (Δx, Δy) in the vicinity of the coordinates of the target pixel (x1, y1) as shown in FIG. 10. The three-dimensional position is measured by comparing the luminance ratio ρ0 of the target pixel and the average luminance ratio ρm obtained in the vicinity of the coordinates.

Figure 11:
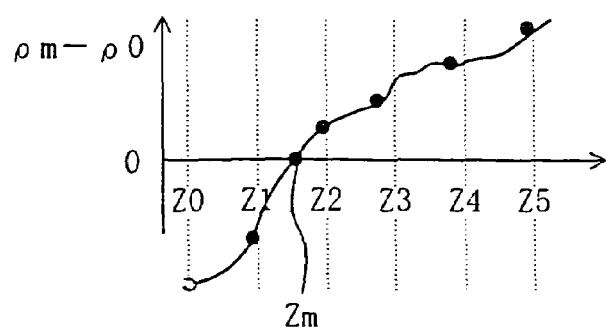
FIG. 11 is a graph for showing the relationship between a difference in the luminance ratio ($\rho m-\rho 0$) and a depth value of each luminance ratio image.

FIG. 11 is a graph for showing the relationship between a difference in the luminance ratio (ρm−ρ0) and the depth value of each luminance ratio image. As shown in FIG. 11, a point where the difference (ρm−ρ0) is zero, namely, a Z value Zm of the luminance ratio image at which the luminance ratio ρ0 obtained in the target pixel (x1, y1) is estimated to be equal to the average luminance ratio ρm obtained in the vicinity of the coordinates, can be obtained as the depth value of the target pixel (x1, y1). In this case, there is no need to previously obtain a regression curve, and the three-dimensional measurement can be realized through simple calculation.

Figure 12:
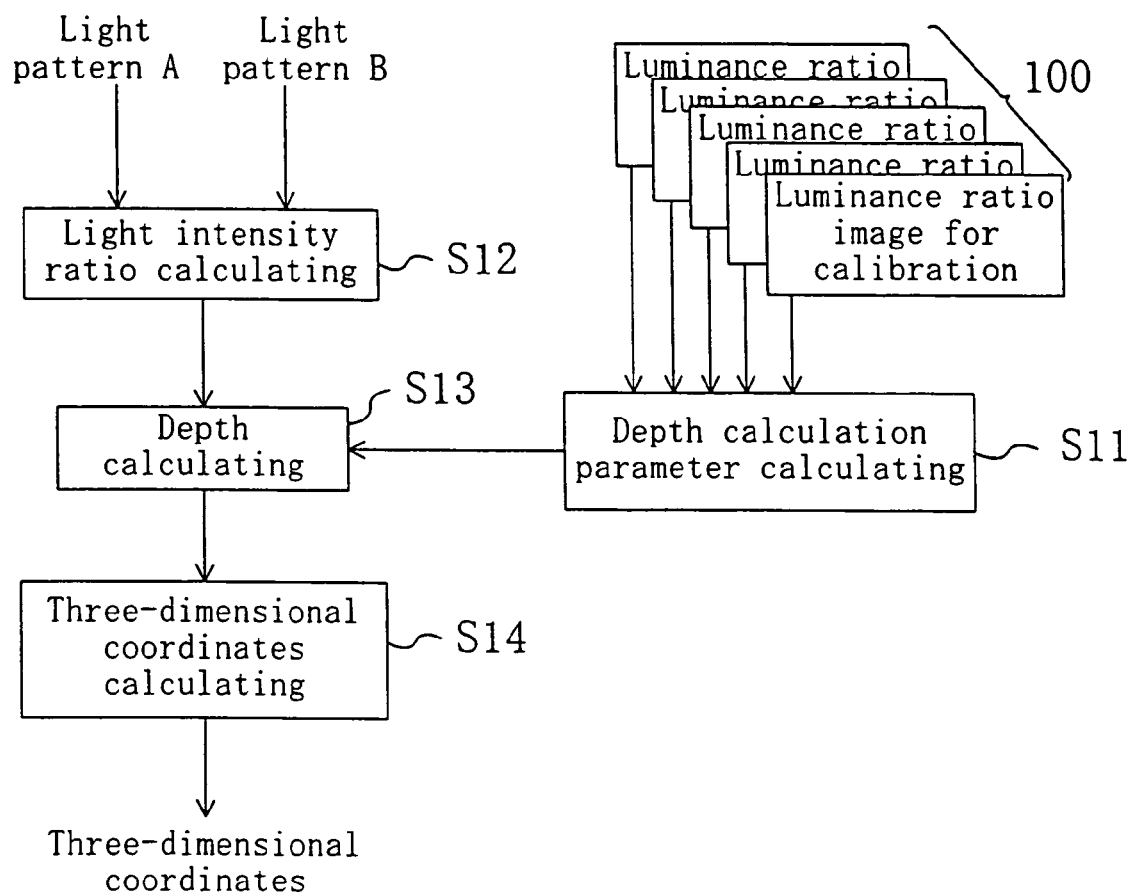
FIG. 12 is a diagram for showing another example of the three-dimensional measurement of the embodiment.

FIG. 12 is a diagram for showing still another example of the three-dimensional measurement of this embodiment. In FIG. 12, a reference numeral 100 denotes a memory for previously storing luminance ratio images with respect to a plurality of depth values, S11 denotes a depth calculation parameter calculating step, S12 denotes a light intensity ratio calculating step for calculating a light intensity ratio image based on the light patterns A and B, S13 denotes a depth calculating step and S14 denotes a three-dimensional coordinates calculating step. The memory 100 is included in the distance calculation unit 13 of FIG. 1, and the steps S11 through S14 are executed by the distance calculation unit 13.

The memory 100 previously stores the luminance ratio images with respect to the plural depth values obtained in the same manner as in the three-dimensional measurement shown in FIG. 9.

Figure 13:
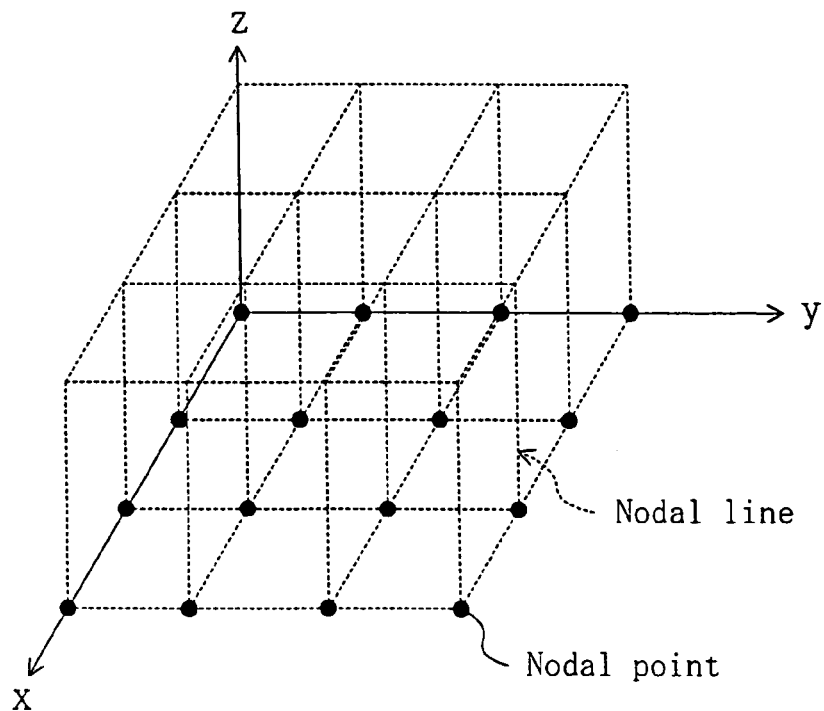
FIG. 13 is a diagram for showing representative points used in the three-dimensional measurement.

Next, the calculation of a depth value Z among the three-dimensional coordinates will be described. The depth value Z is calculated, as shown in FIG. 13, with respect to each pixel through interpolation calculation using a relational expression between the light intensity ratio ρ and the depth value Z in each of nodal points (representative points) arranged in the form of a rectangle in the luminance ratio image. Specifically, in FIG. 13, the relationship between the light intensity ratio ρ and the depth value Z obtained between nodal lines is determined through the interpolation calculation using the relational expression between the light intensity ratio ρ and the depth value Z on each line (nodal line) drawn through the nodal points and extending parallel to the Z-axis.

Now, the calculation of the relational expression between the light intensity ratio ρ and the depth value Z on the nodal line (namely, calibration) will be described.

The relationship between the light intensity ratio ρ and the depth value Z on a nodal line is obtained by applying a space distribution model of the light intensity ratio to light intensity ratios obtained on planes (calibration planes) respectively disposed at a plurality of distances. Thus, the light intensity ratio ρ and the distance value Z can be related to each other, so that the depth value can be calculated.

Figure 14:
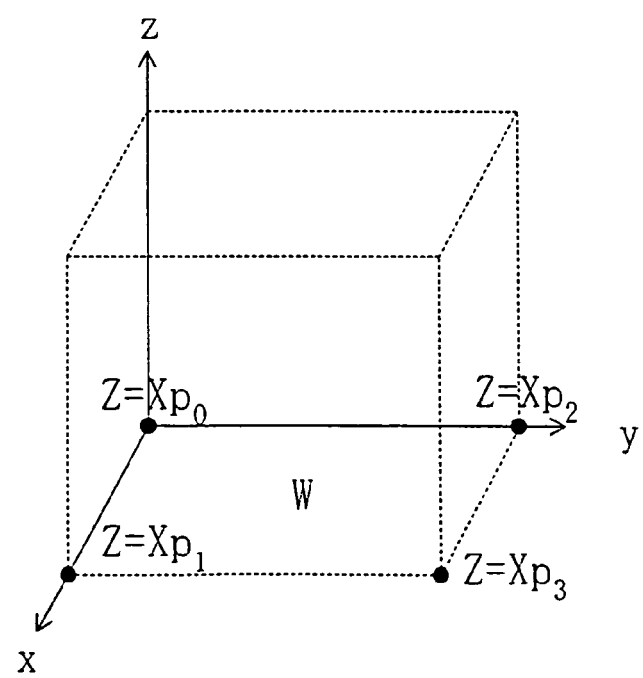
FIG. 14 is a diagram of a finite element model used in distance calculation.

FIG. 14 shows an infinite element model used in the distance calculation. In FIG. 14, x and y denote coordinate values of a pixel and Z denotes a depth value (three-dimensional coordinate value). Elements are defined as a square pole composed of four nodal lines vertical to the xy plane. In this model, the distance Z is obtained on the basis of a distribution of the light intensity ratio ρ in the three-dimensional space of xyZ. Specifically, an equation, ρ(x, y, Z) is observed and this equation is solved for Z.

In this embodiment, with respect to each nodal line, the relationship between the light intensity ratio ρ and the distance Z is modeled as a cubic equation by using the following equation 1:

Equation 1:

$$Z = Xp_i = \begin{pmatrix} \rho^3 & \rho^2 & \rho & 1 \end{pmatrix} \begin{pmatrix} a_i \\ b_i \\ c_i \\ d_i \end{pmatrix} \quad (i = 0, 1, 2, 3)$$

wherein $\rho$ is the light intensity ratio and p (=(a, b, c, d)t) is a parameter vector. Since the nodal lines are two-dimensionally disposed as shown in FIG. 13, distance calculation with constant accuracy can be carried out in accordance with optional change of the parameter vector p. Specifically, when the nodal lines are densely disposed, although the calculation quantity is increased, the accuracy in measuring the depth value can be improved, and when the nodal lines are sparsely disposed, although the accuracy in calculating the depth value is lowered, the calculation quantity can be reduced.

In coordinate values of a pixel positioned between nodal lines, the parameter vector p is determined through linear interpolation of parameter vectors p0 through p3 of the nodal lines as follows:

$$Z = Xp \qquad \text{Equation 2:}$$

At this point, the following equation 3 holds:

$$p = (1-s)(1-t)p_0 + s(1-t)p_1 + (1-s)tp_2 + stp_3 \qquad \text{Equation 3:}$$

wherein s and t are linear weights in the x-direction and the y-direction. The parameter vectors p0, p1, p2 and p3 of the respective nodal lines are determined so as to minimize a distance error in the previously stored plural planes (calibration planes) within the ranges of the elements, namely, so as to minimize the following equation 4:

Equation 4:

$$J = \sum_{k=1}^{n} \sum_{W \in x, y} (X_{xy} p - Z_k)^2$$

wherein W is a bottom area of the elements surrounded with the four nodal lines as shown in FIG. 14, n is the number of planes (calibration planes) disposed in the Z-direction. On the basis of the condition for minimizing Equation 4, namely, on the basis of the following equation 5:

Equation 5:

$$\frac{\partial J}{\partial p_0} = \frac{\partial J}{\partial p_1} = \frac{\partial J}{\partial p_2} = \frac{\partial J}{\partial p_3} = 0$$

the following equation 6 is obtained.

Equation 6:

$$\frac{\partial J}{\partial p_0} = 2\sum_{k=1}^{n} \sum_{W \in x, y} (1 - s_x)(1 - t_y) X_{xy}^t (X_{xy} p - Z_k) = 0$$

$$\frac{\partial J}{\partial p_1} = 2\sum_{k=1}^{n} \sum_{W \in x, y} s_x (1 - t_y) X_{xy}^t (X_{xy} p - Z_k) = 0$$

$$\frac{\partial J}{\partial p_2} = 2\sum_{k=1}^{n} \sum_{W \in x, y} (1 - s_x) t_y X_{xy}^t (X_{xy} p - Z_k) = 0$$

$$\frac{\partial J}{\partial p_3} = 2\sum_{k=1}^{n} \sum_{W \in x, y} s_x t_y X_{xy}^t (X_{xy} p - Z_k) = 0$$

When Equation 6 is rearranged, the following equation 7 is obtained:

Equation 7:

$$\begin{pmatrix} \sum_{k=1}^{n} \sum_{W \in x,y} (1-s_x)^2(1-t_y)^2 X_{xy}^t X_{xy} & \sum_{k=1}^{n} \sum_{W \in x,y} s_x(1-s_x)(1-t_y)^2 X_{xy}^t X_{xy} & \sum_{k=1}^{n} \sum_{W \in x,y} (1-s_x)^2(1-t_y) X_{xy}^t X_{xy} & \sum_{k=1}^{n} \sum_{W \in x,y} (1-s_x) t_y (1-t_y) X_{xy}^t X_{xy} \\ \sum_{k=1}^{n} \sum_{W \in x,y} (1-s_x)(1-t_y)^2 X_{xy}^t X_{xy} & \sum_{k=1}^{n} \sum_{W \in x,y} s_x(1-t_y)^2 X_{xy}^t X_{xy} & \sum_{k=1}^{n} \sum_{W \in x,y} (1-s_x) t_y (1-t_y) X_{xy}^t X_{xy} & \sum_{k=1}^{n} \sum_{W \in x,y} s_x^2 t_y (1-t_y) X_{xy}^t X_{xy} \\ \sum_{k=1}^{n} \sum_{W \in x,y} (1-s_x)^2(1-t_y) X_{xy}^t X_{xy} & \sum_{k=1}^{n} \sum_{W \in x,y} s_x(1-s_x) t_y (1-t_y) X_{xy}^t X_{xy} & \sum_{k=1}^{n} \sum_{W \in x,y} (1-s_x)^2 t_y^2 X_{xy}^t X_{xy} & \sum_{k=1}^{n} \sum_{W \in x,y} s_x(1-s_x) t_y^2 X_{xy}^t X_{xy} \\ \sum_{k=1}^{n} \sum_{W \in x,y} S_x(1-s_x) t_y (1-t_y) X_{xy}^t X_{xy} & \sum_{k=1}^{n} \sum_{W \in x,y} S_x^2 t_y (1-t_y) X_{xy}^t X_{xy} & \sum_{k=1}^{n} \sum_{W \in x,y} s_x(1-s_x) t_y^2 X_{xy}^t X_{xy} & \sum_{k=1}^{n} \sum_{W \in x,y} s_x^2 t_y^2 X_{xy}^t X_{xy} \end{pmatrix} \begin{pmatrix} p_0 \\ p_1 \\ p_2 \\ p_3 \end{pmatrix} =$$

$$\begin{pmatrix} \sum_{k=1}^{n} \sum_{W \in x,y} (1-s_x)(1-t_y) X_{xy}^t Z_k \\ \sum_{k=1}^{n} \sum_{W \in x,y} s_x(1-t_y) X_{xy}^t Z_k \\ \sum_{k=1}^{n} \sum_{W \in x,y} (1-s_x) t_y X_{xy}^t Z_k \\ \sum_{k=1}^{n} \sum_{W \in x,y} s_x t_y X_{xy}^t Z_k \end{pmatrix}$$

This is a simultaneous equation for local elements. With respect to the entire system including plural elements, simultaneous equations for local elements are added, so as to determine a simultaneous equation of the entire system. When this simultaneous equation is solved, all the parameters a, b, c and d of the respective nodal lines can be obtained.

When nodal lines are disposed at vertical and horizontal intervals of 10 pixels in a luminance ratio image with a width of 640 pixels and a height of 480 pixels, 3185 (65×49) nodal lines are arranged. Since each nodal line has the four parameters a, b, c and d, simultaneous equations with 12740 (3185×4) elements are solved, so as to determine the parameters necessary for calculating the depth values (Z values) of the respective pixels of the input image.

In the depth calculation parameter calculating step S11, the aforementioned calculations are carried out with respect to the plural luminance ratio images for the calibration previously stored in the memory 100, so as to determine the parameters necessary for the depth calculation.

In the light intensity ratio calculating step S12, the light intensity ratio ρ of each pixel of the input images (corresponding to the light patterns A and B) is calculated.

In the depth calculating step S13, the depth value Z of each pixel is calculated in accordance with Equations 2 and 3 by using the coordinate values x and y of the target pixel, the light intensity ratio ρ of the target pixel and the parameters of close four nodal lines.

In the three-dimensional coordinates calculating step S14, remaining three-dimensional coordinate values X and Y are calculated on the basis of the coordinate values x and y of the pixel and the depth value Z. The coordinate values x and y of the pixel and the depth value Z are converted into the three-dimensional coordinate values X and Y by using geometric characteristics of the camera system (such as a viewing angle per pixel and lens strain).

When the light patterns A and B and the plural images used in the calculation of the calibration light intensity ratios are subjected to a low-pass filter, the influence of noise included in the images can be reduced. Also, when the depth value is subjected to a low-pass filter or a median filter, the same effect can be attained.

When the interval between nodal points is reduced, the number of parameters used in the calculation is increased but the accuracy in calculating the distance can be improved, and when the interval is increased, the number of parameters is reduced but the accuracy in calculating the distance is lowered. As a result of current experiments, it is found that the accuracy in calculating the distance is minimally lowered even when the vertical and horizontal interval between nodal points is increased up to approximately 50 pixels in an image with a width of 640 pixels and a height of 480 pixels.

Through the aforementioned three-dimensional measurement calculation, the three-dimensional measurement can be accurately carried out even when the light source is not a point light source but has a given size as the light source array unit 11 of this embodiment. Needless to say, even when a point light source is used, the aforementioned three-dimensional measurement can be employed. Furthermore, it goes without saying that the aforementioned method is effective in using a light source apparatus with a given size other than the light source array.

(Modification of Light Quantity)

Figure 15B:
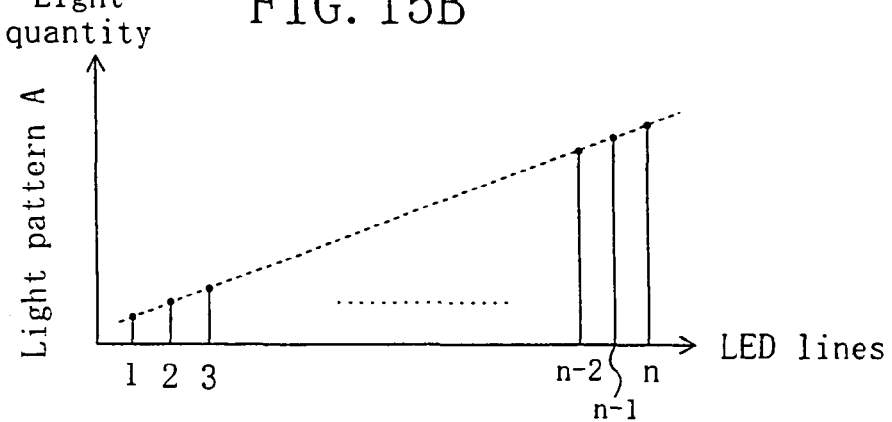

FIG. 15A is a graph for showing the distribution of a brightness ratio obtained by projecting the light patterns A and B of FIGS. 4A and 4B on a frontal parallel plane disposed in front of a camera. FIG. 15B shows the emission intensity of each LED of the light source array unit 11 in projecting the light pattern A.

As is understood from FIG. 15A, a region where the brightness ratio is monotonically reduced (or monotonically increased), namely, a range used in the three-dimensional measurement, is merely a region α in the entire projection range of the light pattern. This is because the light quantity of the light source array unit 11 is reduced and hence the light quantity is not linearly changed in the vicinity of the edges of the projection range of the light pattern. In other words, although the radiation angles of the respective LEDs mutually overlap and the overlap portions are added up so as to realize a constant change of the light quantity in the light pattern, the number of LEDs whose emissions are effectively added up is reduced in the vicinity of the edges of the array, and hence, the light quantity is relatively lowered. Also, another reason is the quantity of received light is reduced in the periphery of an image taken by the camera 1 derived from the lens shading.

For these reasons, the range used in the three-dimensional measurement is restricted to be smaller than the projection range of the light patterns. Therefore, in order to enlarge the spatial range where the three-dimensional position can be measured, the light quantity of each LED is herein modified by using a modification coefficient as shown in FIG. 15C.

Figure 15C:
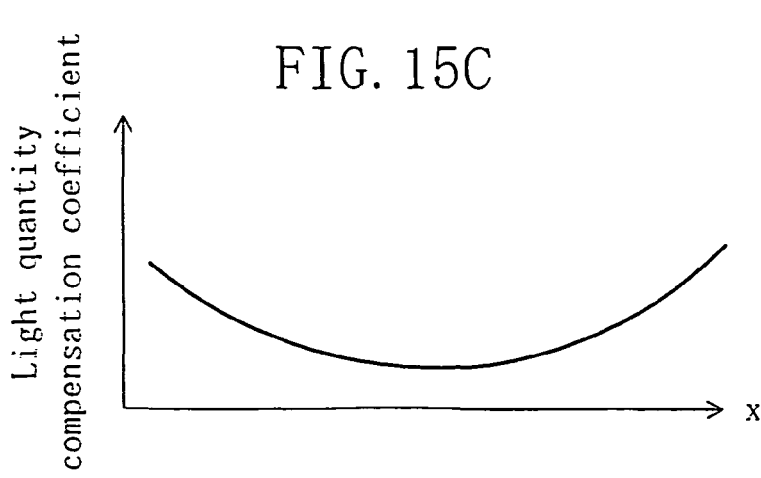

Specifically, a product obtained by multiplying a light quantity control value in accordance with the light pattern as shown in FIG. 15B by the modification coefficient as shown in FIG. 15C is used as a new light quantity control value. Thus, without changing the light quantity ratio between the two kinds of light patterns, the light quantities of the light sources disposed in the vicinity of the edges of the light source array unit 11 are increased by a predetermined ratio as compared with the light quantities of the light sources disposed at the center, so as to suppress the lowering of the light quantity at the edges of the light source array unit 11, resulting in enlarging the region a shown in FIG. 15A. Specifically, when the emission intensities of the light sources disposed in the vicinity of the edges of the light source array unit 11 are modified, a spatial range where high brightness is attained can be enlarged and a spatial range where the brightness ratio is monotonically changed can be enlarged. As a result, the spatial range where the three-dimensional position can be measured is enlarged.

Figure 16A:
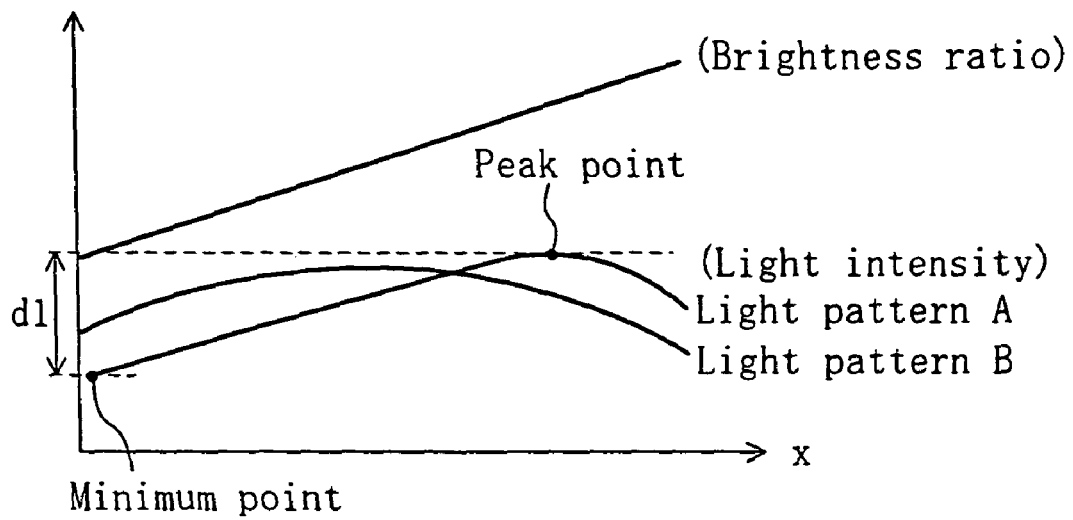
FIGS. 16A and 16B are graphs for showing the relationship between light patterns and a brightness ratio obtained through experiments by the present inventors.
Figure 16B:
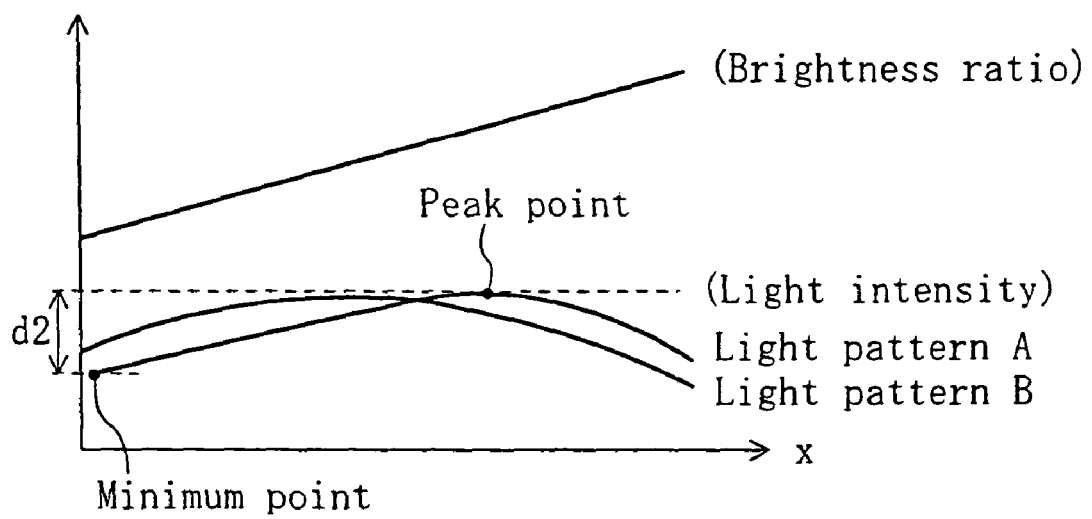

FIGS. 16A and 16B are graphs for showing the relationship between the light pattern and the brightness ratio measured through experiments by the present inventors. FIG. 16A shows data obtained before the modification and FIG. 16B shows data obtained after the modification. As shown in FIG. 16A, a brightness difference d1 between a peak point and a minimum point in the vicinity of the edge is large and cannot be measured in the periphery before the modification. In contrast, through the aforementioned modification, a brightness difference d2 between a peak point and a minimum point in the vicinity of the edge can be reduced as shown in FIG. 16B with the brightness ratio kept as that of FIG. 16A. Thus, the measurable range can be enlarged.

In the case where the light patterns are generated by controlling the emission time instead of the emission intensity, the same effect can be attained by multiplying the emission time by the modification coefficient as shown in FIG. 15C.

Embodiment 2

Figure 17A:
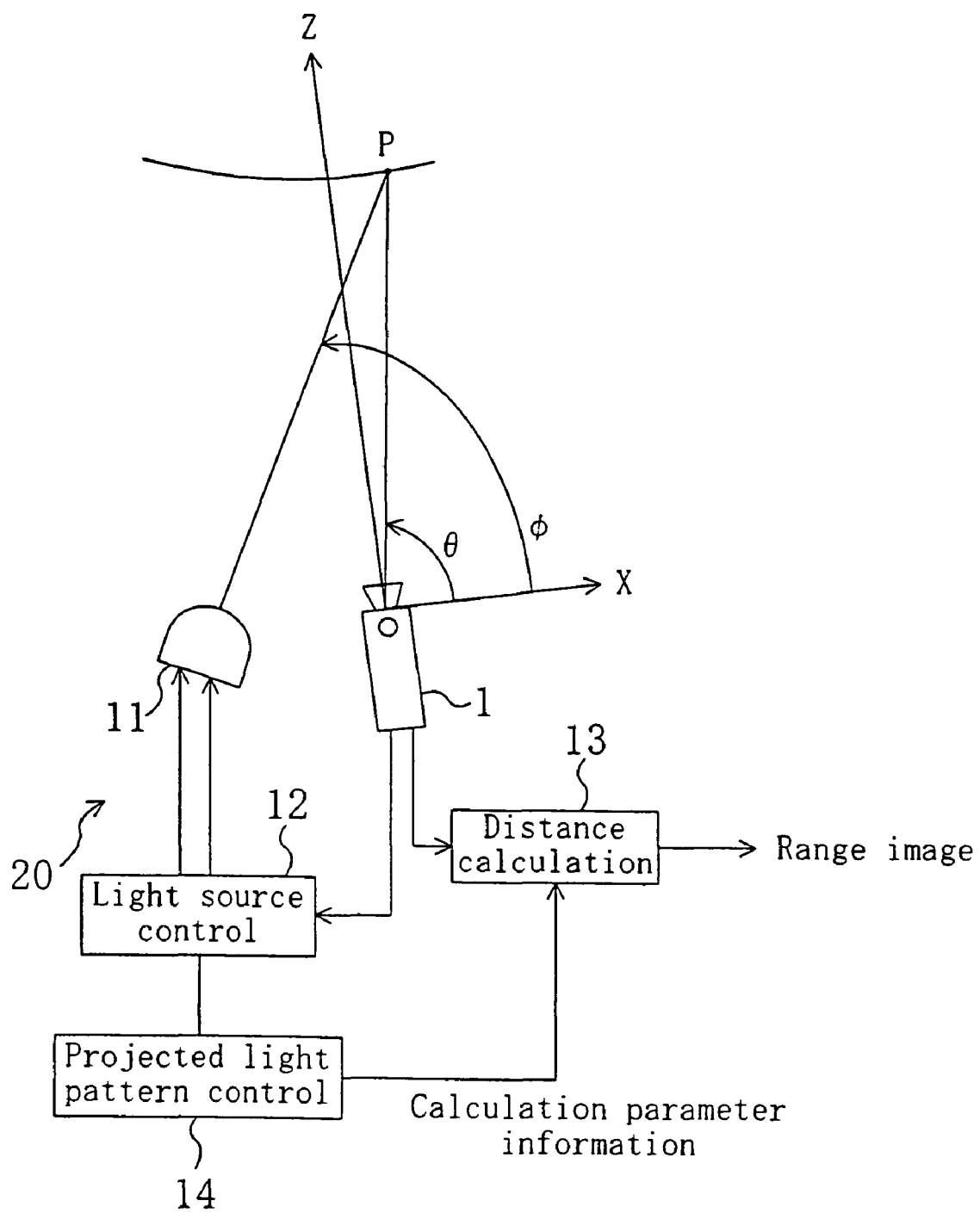
FIG. 17 is a block diagram for showing the structure of a range finder according to Embodiment 2 of the invention.

FIG. 17 is a diagram for showing the structure of a range finder according to Embodiment 2 of the invention. In FIG. 17, like reference numerals are used to refer to like elements shown in FIG. 1. The range finder of FIG. 17 further includes a projected light pattern control unit 14 for instructing the light source control unit 12 about the kind of set of light patterns to be projected from the light source array unit 11. The light source array unit 11 and the light source control unit 12 together form a projection unit 20.

As a characteristic of this embodiment, the measurement range and the measurement accuracy can be changed by changing the kind of set of projected light patterns by the projected light pattern control unit 14. The basic operation of the range finder of this embodiment is the same as that of Embodiment 1, and specifically, two kinds of light patterns as shown in FIGS. 4A and 4B are projected and reflected light from a subject is taken with the camera 1, so as to measure the three-dimensional position of the subject. The three-dimensional measurement is also carried out in the same manner as in Embodiment 1. The projected light pattern control unit 14 supplies the distance calculation unit 13 with calculation parameter information necessary for the three-dimensional measurement in accordance with the kind of set of light patterns instructed to the light source control unit 12.

Figure 18A:
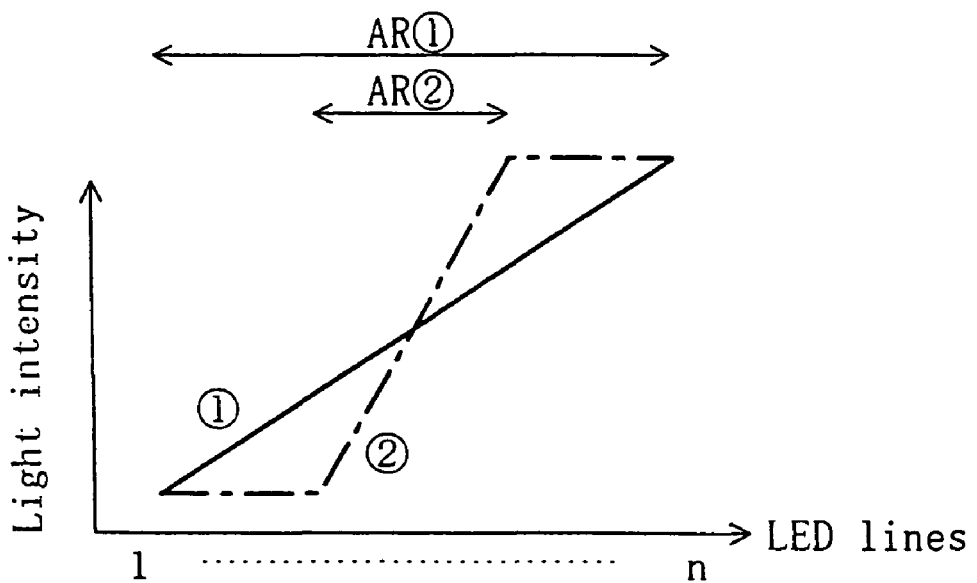
FIGS. 18A and 18B are diagrams for showing an example of control of a measurement range in Embodiment 2 of the invention, and specifically.
Figure 18B:
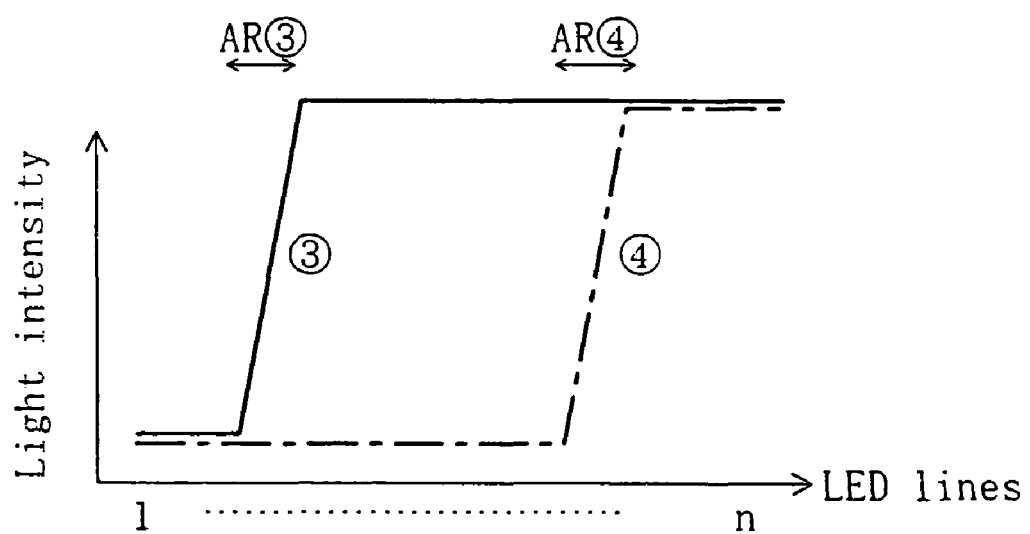

FIGS. 18A and 18B are diagrams for showing examples of the control of the measurement range. In FIG. 18A, the size of the measurement range is changed. Specifically, in the case shown as ①, the emission intensity is changed over the entire light projection range of the light source array unit 11 as described in Embodiment 1, and the resultant measurement range AR① is the largest. In contrast, in the case shown as ②, the emission intensity is changed in merely a substantially center part of the light projection range, and hence, the resultant measurement range AR② is smaller. However, in the case ②, although the measurement range is smaller, the change of the emission intensity within the measurement range is larger than in the case ①, and hence, the measurement accuracy can be higher than in the case ①.

Alternatively, in FIG. 18B, the position of the measurement range is changed. Specifically, in the case shown as ③, a part on the left hand side within the projection range of the light patterns corresponds to a measurement range AR③, and in the case shown as ④, a part on the right hand side within the projection range corresponds to a measurement range AR④. Specifically, the measurement range can be optionally moved within the viewing angle of the camera. In other words, the direction of the measurement can be changed.

When the light source array unit 11 is used, any of the optional light patterns as shown in FIGS. 18A and 18B can be very easily electronically generated by controlling a voltage or current applied to each light source. Therefore, the range finder can be provided with a variety of measurement modes.

Figure 19A:
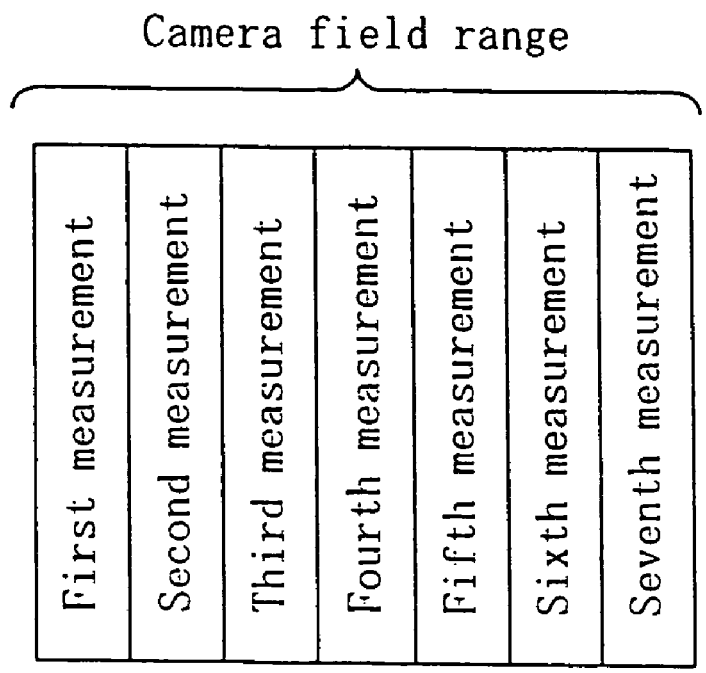
FIGS. 19A and 19B are diagrams of examples of measurement modes of Embodiment 2 of the invention.
Figure 19B:
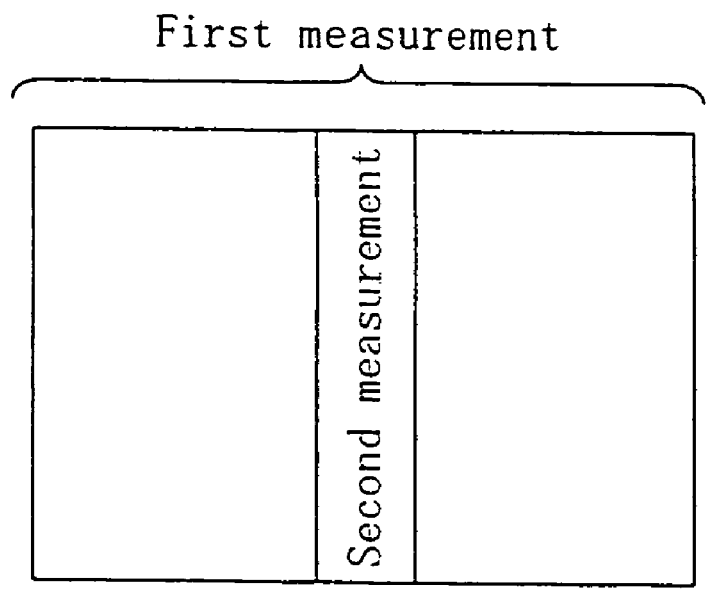

FIGS. 19A and 19B show examples of the measurement modes. The measurement range is divided into plural (seven in the drawing) ranges as shown in FIG. 19A, the light pattern as shown in FIG. 18B is projected in each of the divided measurement ranges, and the three-dimensional measurement is successively carried out in these divided measurement range, so as to synthesize the measurement results. Thus, highly accurate three-dimensional measurement can be carried out over the entire field of the camera. In other words, in addition to the general measurement mode for projecting a first set of light patterns having the general projection range as in the case ① of FIG. 18A, an accurate measurement mode in which a second set of light patterns having a smaller projection range than the first set of light patterns is projected in a plurality of directions as shown in FIG. 19A can be provided.

Alternatively, as shown in FIG. 19B, the light patterns are first projected in the entire field of the camera for the three-dimensional measurement, and thereafter, an interesting portion is specified in the resultant image data, so that the second set of light patterns having the smaller projection range can be projected in the specified portion for more accurate measurement. Thus, a measurement mode for conducting an intelligent operation can be provided.

As described so far, according to this embodiment, the range and the direction of the three-dimensional measurement can be electronically changed. Also, the accuracy in the three-dimensional measurement can be controlled if necessary.

Although an optional light pattern is generated by using the light source array unit in this embodiment, an optional light pattern can be generated by, for example, scanning a point light source with a galvano-mirror. In other words, the same effect can be attained by varying the light intensity of the light source with time during the mirror scanning. Furthermore, similar light patterns can be generated by using a projector for reproducing an image sequence as the light source. Specifically, a light pattern can be generated by displaying any of the light patterns of FIGS. 18A and 18B on the projector.

In each of the embodiments of the invention, the light source array unit can be plural in number, so that the respective light source array units can be disposed so as to have different projection directions. Thus, the light patterns can be projected over a larger spatial range.

In each of the embodiments, although the plural light patterns A and B are generated on a time-shared basis, the two kinds of light patterns can be simultaneously projected by using light sources of different wavelengths. In this case, for example, two kinds of light sources of different wavelengths are uniformly mixed to be disposed in the light source array unit 11, so as to generate the light patterns A and B by using the light sources of the respective wavelengths. However, in this case, the camera is required to be provided with a mechanism for selecting the wavelength such as a filter. Alternatively, a similar structure can be realized by using a light source capable of outputting a plurality of lights of different wavelengths.

The light source array unit of this invention can be similarly realized by using a light source other than the LED, such as an organic EL (electroluminescence) device.

Figure 20:
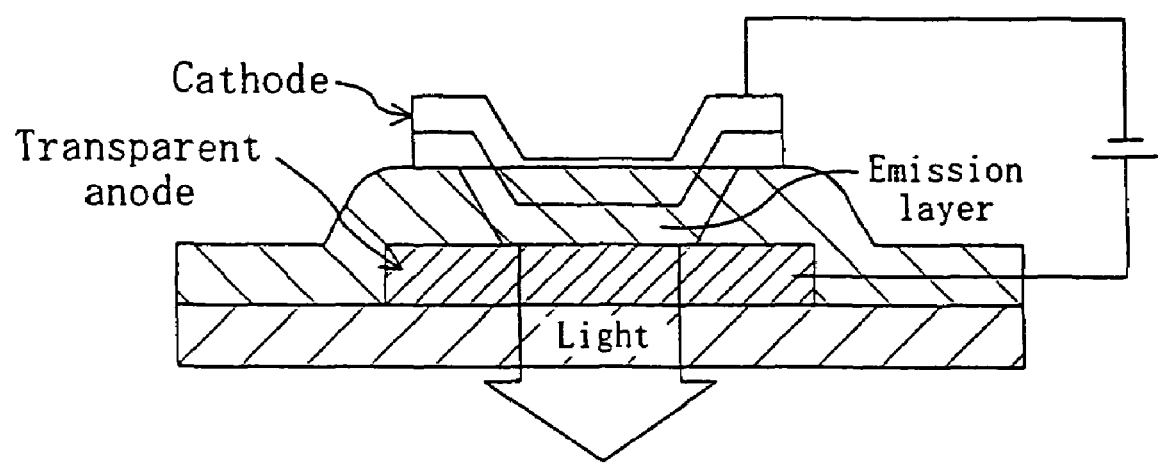
FIG. 20 is a diagram for showing the structure of an organic EL device.

FIG. 20 is a diagram for showing the structure of one pixel of an EL display. As shown in FIG. 20, the organic EL device has a structure including an organic thin film sandwiched between an anode and a cathode. When a DC voltage is applied, holes are injected from the anode and electrons are injected from the cathode. The holes and the electrons are recombined in the organic thin film, and energy generated at this point excites the organic material, so as to emit light of a color peculiar to the organic material. The light emitted from the organic material is output to the outside because at least one of the electrodes (the anode in the drawing) is transparent.

The organic EL display is fabricated by two-dimensionally arranging the devices each having the structure of FIG. 20 as RGB pixels. This structure is similar to the light source array of FIG. 3A or 3B, and hence, the light patterns described in the embodiments can be generated. In this case, when each pixel is provided with a microlens, the spread of light is narrowed, so as to more efficiently project the light.

Alternatively, a surface emitting light source can be obtained by increasing the structure of each device. In this case, the light distribution as shown in FIG. 15A can be obtained by applying different voltages in accordance with the positions of the electrodes.

Also, the range finder described in each embodiment is capable of measuring the three-dimensional position of a subject, and hence can be used in an apparatus for individual certification by using an iris of a person. In this case, the three-dimensional position of an eye of a person is first measured with the range finder, and the camera is accurately zoomed up toward the position so as to take an enlarged iris pattern of the person. Then, the certification processing is executed by using the taken image of the iris. Alternatively, the range finder can be used for generating three-dimensional shape data of a subject. In this case, on the basis of a range image measured by the range finder, the subject is represented by the polygon expression used in three-dimensional CG (computer graphics). Thus, the three-dimensional shape of the subject can be dealt with as general CG data.

In this manner, according to the invention, the three-dimensional measurement can be stably carried out because a sufficient quantity of light can be projected on a subject as a whole even when each light source has a small light quantity. Also, an optional light pattern can be electrically generated without using a mechanical mechanism.

What is claimed is:

1. A light source apparatus for a range finder comprising a plurality of light sources arranged therein, being operable to project at least two kinds of desired light patterns according to control of a light emitting state of each of said plurality of light sources by a light source controller, wherein said plurality of light sources are arranged in an array on a flat surface with optical axes thereof disposed radially toward an object adapted for measuring a range, having linear groups aligned in parallel, and said optical axes of light sources in each said linear group are radially disposed outward in a common plane, and intensity of the light sources increases or decreases monotonically in a linear group.

* * * * *